US011570752B2

(12) United States Patent
Zhang et al.

(10) Patent No.: US 11,570,752 B2
(45) Date of Patent: Jan. 31, 2023

(54) MONITORING MULTICAST BROADCAST CONTROL INFORMATION

(71) Applicant: QUALCOMM Incorporated, San Diego, CA (US)

(72) Inventors: Xiaoxia Zhang, San Diego, CA (US); Xipeng Zhu, San Diego, CA (US); Le Liu, Fremont, CA (US); Alberto Rico Alvarino, San Diego, CA (US); Kazuki Takeda, Tokyo (JP); Prasad Reddy Kadiri, San Diego, CA (US); Umesh Phuyal, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 130 days.

(21) Appl. No.: 17/107,171

(22) Filed: Nov. 30, 2020

(65) Prior Publication Data
US 2021/0204248 A1 Jul. 1, 2021

Related U.S. Application Data

(60) Provisional application No. 62/954,829, filed on Dec. 30, 2019.

(51) Int. Cl.
*H04W 72/00* (2009.01)
*H04W 72/04* (2009.01)
*H04L 1/18* (2006.01)

(52) U.S. Cl.
CPC ......... *H04W 72/005* (2013.01); *H04L 1/1812* (2013.01); *H04W 72/042* (2013.01)

(58) Field of Classification Search
CPC ... H04W 28/04; H04W 72/04; H04W 72/042; H04W 88/08; H04W 72/005; H04L 5/0007; H04L 1/1812
(Continued)

(56) References Cited

U.S. PATENT DOCUMENTS

| 10,419,892 B2 * | 9/2019 | Mazzarese | ............ H04W 72/04 |
| 2011/0075621 A1 * | 3/2011 | Sung | ...................... H04W 48/12 |
| | | | 370/329 |

(Continued)

FOREIGN PATENT DOCUMENTS

| EP | 2 676 504 A1 * | 12/2013 | ............ H04W 72/05 |
| EP | 2676504 A1 | 12/2013 | |

(Continued)

OTHER PUBLICATIONS

3GPP TSG-RAN WG1 Meeting #98bis, Chongqing, China, Oct. 14-20, 2019, R1-1910900, Draft Change Request, 38.212 CR rev, Current version 15.7.0, Source to WG: Ericsson, Title: Determination of the number of reservation bits in DCI format 1_0. (Year: 2019).*

(Continued)

*Primary Examiner* — Peter G Solinsky
*Assistant Examiner* — Sanjay K Dewan
(74) *Attorney, Agent, or Firm* — Harrity & Harrity, LLP

(57) ABSTRACT

Various aspects of the present disclosure generally relate to wireless communication. In some aspects, a user equipment (UE) may receive a notification of a change to multicast broadcast (MB) control information associated with at least one MB service to which the UE is subscribed, the MB control information being included in an MB control channel (MBCCH) scheduled by a physical downlink control channel (PDCCH) communication addressed to an MB radio network temporary identifier (MB-RNTI); and monitor one or more resources of the MBCCH to receive updated MB control information based at least in part on receiving the notification of the change to the MB control information. Numerous other aspects are provided.

30 Claims, 18 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0216686 A1* | 9/2011 | Wu ..................... | H04W 72/005 370/312 |
| 2012/0134311 A1* | 5/2012 | Zhai ................... | H04W 72/005 370/312 |
| 2014/0086173 A1* | 3/2014 | Sadeghi ................. | H04L 5/005 370/328 |
| 2014/0133383 A1* | 5/2014 | Park ....................... | H04W 4/08 370/312 |
| 2015/0085717 A1* | 3/2015 | Papasakellariou .... | H04L 5/0044 370/280 |
| 2015/0181575 A1* | 6/2015 | Ng .......................... | H04B 7/26 370/329 |
| 2015/0373668 A1* | 12/2015 | Lee ..................... | H04W 72/005 370/329 |
| 2016/0007319 A1* | 1/2016 | He ....................... | H04W 72/044 370/312 |
| 2018/0019794 A1* | 1/2018 | Kowalski ................ | H04L 5/003 |
| 2018/0160436 A1* | 6/2018 | Park ....................... | H04L 67/12 |
| 2019/0149276 A1* | 5/2019 | Xiong ..................... | H04L 1/00 370/329 |
| 2019/0182802 A1* | 6/2019 | Yu ..................... | H04W 72/1289 |
| 2019/0223160 A1* | 7/2019 | He ....................... | H04L 5/0053 |
| 2019/0327582 A1* | 10/2019 | Lee ........................ | H04W 8/08 |
| 2020/0022144 A1* | 1/2020 | Papasakellariou .. | H04W 72/042 |
| 2022/0046687 A1* | 2/2022 | Shrivastava ...... | H04W 72/1289 |

FOREIGN PATENT DOCUMENTS

| | | | | |
|---|---|---|---|---|
| EP | 3 120 602 A1 | * | 1/2017 | ............ H04W 72/12 |
| EP | 3120602 A1 | | 1/2017 | |
| KR | WO 2016/122193 A1 | * | 8/2016 | ............. H04W 4/06 |
| WO | 2015100724 A1 | | 7/2015 | |
| WO | WO 2015/100724 A1 | * | 7/2015 | ............ H04W 72/12 |

OTHER PUBLICATIONS

3GPP TSG-RAN WG1 Meeting #58bis, Miyazaki, Japan, Oct. 12-16, 2009, R1-093888, Agenda item: 4, Source: InterDigital Communications, LLC, Title: Unicast Reuse of MBSFN-reserved subframes. (Year: 2009).*

On the Performance of PDCCH in LTE and 5G New Radio, Hangzhichen, Manuel Fuentes et al., Institute for Communications Systems, University of Surrey, UK, Inst. of Telecom and Multimedia Applications, Spain, Samsung Electronics R&D UK, 2018, IEEE. (Year: 2018).*

3GPP TSG RAN#72 bis meeting, Dublin Ireland, Jan. 17-21, 2011, Tdoc: R2-110313, Agenda item: 7.3, Source: Samsung, Title: Clarifications regarding MBMS Rel-10, CR to 36.331. (Year: 2011).*

International Search Report and Written Opinion—PCT/US2020/062678—ISA/EPO—dated Mar. 16, 2021.

Samsung: "Clarifications Regarding MBMS REL-10 CR to 36.331". 3GPP Draft, 3GPP TSG-RAN2#72 bis meeting, R2-110313 TP to 36331 Rel-10 on MBMS Related Issues, 3RD Generation Partnership Project (3GPP), Mobile Competence Centre, 650, Route Des Lucioles, F-06921 Sophia-Antipolis Cedex, France, vol. RAN WG2. No. Dublin, Ireland, Jan. 17, 2011, Jan. 10, 2011 (Jan. 10, 2011), XP050492837, 10 Pages, [retrieved on Jan. 10, 2011] the whole document.

* cited by examiner

MONITORING MULTICAST BROADCAST CONTROL INFORMATION

CROSS-REFERENCE TO RELATED APPLICATION

This patent application claims priority to Provisional Patent Application No. 62/954,829, filed on Dec. 30, 2019, entitled "MONITORING MULTICAST BROADCAST CONTROL INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for monitoring multicast broadcast control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

When multicast broadcast (MB) control information is updated, a base station may need to signal such change to UEs served by the base station so that UEs subscribed to MB services can obtain the updated MB control information. Some signaling techniques may be more suitable for some MB system designs as compared to other MB system designs. For example, a signaling technique that improves performance or reduces UE power consumption in one MB system design may not achieve the same results in another MB system design.

SUMMARY

In some aspects, a method of wireless communication, performed by a user equipment (UE), may include receiving a notification of a change to multicast broadcast (MB) control information associated with at least one MB service to which the UE is subscribed, the MB control information being included in an MB control channel (MBCCH) scheduled by a physical downlink control channel (PDCCH) communication addressed to an MB radio network temporary identifier (MB-RNTI); and monitoring one or more resources of the MBCCH to receive updated MB control information based at least in part on receiving the notification of the change to the MB control information.

In some aspects, a method of wireless communication, performed by a UE, may include receiving a notification of a change to MB control information associated with at least one MB service to which the UE is subscribed, the MB control information being included in a system information block (SIB) scheduled by a PDCCH communication addressed to a system information radio network temporary identifier (SI-RNTI); and monitoring the SIB to receive updated MB control information based at least in part on receiving the notification of the change to the MB control information.

In some aspects, a method of wireless communication, performed by a UE, may include receiving a notification of a change to MB control information associated with at least one MB service to which the UE is subscribed, the MB control information being included in a unicast radio resource control (RRC) message scheduled by a PDCCH communication addressed to a cell radio network temporary identifier (C-RNTI); and monitoring the unicast RRC message to receive updated MB control information based at least in part on receiving the notification of the change to the MB control information.

In some aspects, a method of wireless communication, performed by a base station, may include transmitting a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; and transmitting updated MB control information based at least in part on transmitting the notification of the change to the MB control information.

In some aspects, a UE for wireless communication may include memory and one or more processors operatively coupled to the memory. The memory and the one or more processors may be configured to receive a notification of a change to MB control information associated with at least one MB service to which the UE is subscribed, the MB control information being included in an MBCCH scheduled by a PDCCH communication addressed to an MB-RNTI;

and monitor one or more resources of the MBCCH to receive updated MB control information based at least in part on receiving the notification of the change to the MB control information.

In some aspects, a UE for wireless communication may include memory and one or more processors operatively coupled to the memory. The memory and the one or more processors may be configured to receive a notification of a change to MB control information associated with at least one MB service to which the UE is subscribed, the MB control information being included in a SIB scheduled by a PDCCH communication addressed to an SI-RNTI; and monitor the SIB to receive updated MB control information based at least in part on receiving the notification of the change to the MB control information.

In some aspects, a UE for wireless communication may include memory and one or more processors operatively coupled to the memory. The memory and the one or more processors may be configured to receive a notification of a change to MB control information associated with at least one MB service to which the UE is subscribed, the MB control information being included in a unicast RRC message scheduled by a PDCCH communication addressed to a C-RNTI; and monitor the unicast RRC message to receive updated MB control information based at least in part on receiving the notification of the change to the MB control information.

In some aspects, a base station for wireless communication may include memory and one or more processors operatively coupled to the memory. The memory and the one or more processors may be configured to transmit a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; and transmit updated MB control information based at least in part on transmitting the notification of the change to the MB control information.

In some aspects, a non-transitory computer-readable medium may store one or more instructions for wireless communication. The one or more instructions, when executed by one or more processors of a UE, may cause the one or more processors to: receive a notification of a change to MB control information associated with at least one MB service to which the UE is subscribed, the MB control information being included in an MBCCH scheduled by a PDCCH communication addressed to an MB-RNTI; and monitor one or more resources of the MBCCH to receive updated MB control information based at least in part on receiving the notification of the change to the MB control information.

In some aspects, a non-transitory computer-readable medium may store one or more instructions for wireless communication. The one or more instructions, when executed by one or more processors of a UE, may cause the one or more processors to: receive a notification of a change to MB control information associated with at least one MB service to which the UE is subscribed, the MB control information being included in a SIB scheduled by a PDCCH communication addressed to an SI-RNTI; and monitor the SIB to receive updated MB control information based at least in part on receiving the notification of the change to the MB control information.

In some aspects, a non-transitory computer-readable medium may store one or more instructions for wireless communication. The one or more instructions, when executed by one or more processors of a UE, may cause the one or more processors to: receive a notification of a change to MB control information associated with at least one MB service to which the UE is subscribed, the MB control information being included in a unicast RRC message scheduled by a PDCCH communication addressed to a C-RNTI; and monitor the unicast RRC message to receive updated MB control information based at least in part on receiving the notification of the change to the MB control information.

In some aspects, a non-transitory computer-readable medium may store one or more instructions for wireless communication. The one or more instructions, when executed by one or more processors of a base station, may cause the one or more processors to: transmit a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; and transmit updated MB control information based at least in part on transmitting the notification of the change to the MB control information.

In some aspects, an apparatus for wireless communication may include means for receiving a notification of a change to MB control information associated with at least one MB service to which the apparatus is subscribed, the MB control information being included in an MBCCH scheduled by a PDCCH communication addressed to an MB-RNTI; and means for monitoring one or more resources of the MBCCH to receive updated MB control information based at least in part on receiving the notification of the change to the MB control information.

In some aspects, an apparatus for wireless communication may include means for receiving a notification of a change to MB control information associated with at least one MB service to which the apparatus is subscribed, the MB control information being included in a SIB scheduled by a PDCCH communication addressed to an SI-RNTI; and means for monitoring the SIB to receive updated MB control information based at least in part on receiving the notification of the change to the MB control information.

In some aspects, an apparatus for wireless communication may include means for receiving a notification of a change to MB control information associated with at least one MB service to which the apparatus is subscribed, the MB control information being included in a unicast RRC message scheduled by a PDCCH communication addressed to a C-RNTI; and means for monitoring the unicast RRC message to receive updated MB control information based at least in part on receiving the notification of the change to the MB control information.

In some aspects, an apparatus for wireless communication may include means for transmitting a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; and means for transmitting updated MB control information based at least in part on transmitting the notification of the change to the MB control information.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
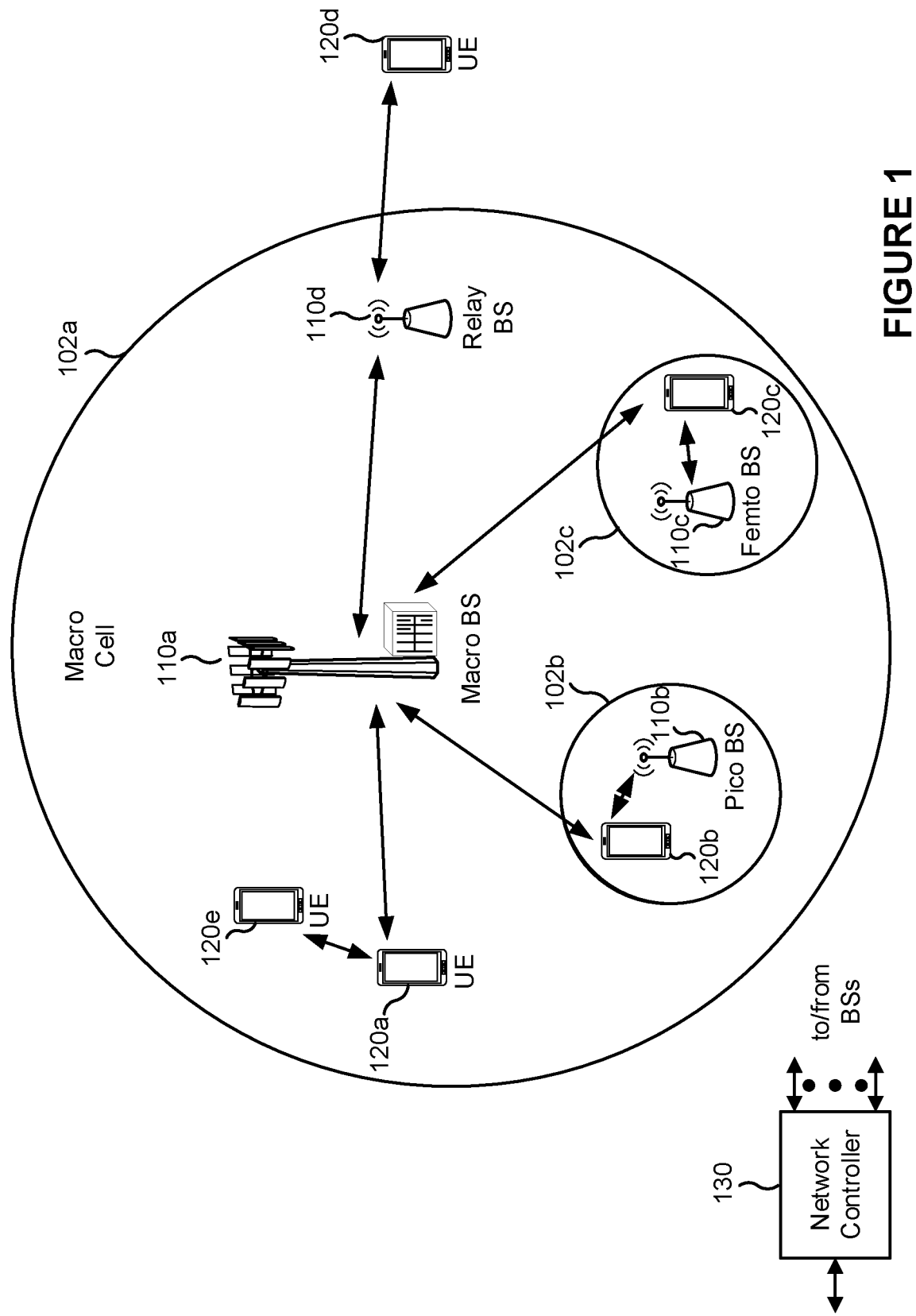
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to transmission of multicast broadcast (MB) control information. Some aspects more specifically relate to using a multicast broadcast control channel (MBCCH) to carry MB control information. In some aspects, an MBCCH communication may be scheduled by a physical downlink control channel (PDCCH) communication that is addressed to a multicast broadcast radio network temporary identifier (MB-RNTI). Some aspects more specifically relate to using a system information block (SIB) to carry MB control information. In some aspects, the SIB may be scheduled by a PDCCH communication addressed to a system information RNTI (SI-RNTI). Some aspects more specifically relate to using a unicast radio resource control (RRC) message to carry MB control information. In some aspects, the unicast RRC message may be scheduled by a PDCCH communication addressed to a cell RNTI (C-RNTI).

Particular aspects of the subject matter described in this disclosure can be implemented to realize one or more of the following potential advantages. In some examples, the described techniques can be used to improve performance in various MB system designs. For example, using an MBCCH communication or a SIB to carry MB control information provides flexibility because the MBCCH communication and the SIB can be received by a UE in an RRC connected mode, an RRC idle mode, and an RRC inactive mode. Using a SIB may reduce system complexity by using legacy signaling mechanisms without creating a new channel (e.g., the MBCCH), while using an MBCCH may reduce power consumption for UEs not subscribed to MB services by introducing UE-specific signaling of MB control information rather than system-wide signaling via a SIB. As another example, using a unicast RRC message to carry MB control information may be less flexible than using the MBCCH communication and the SIB because the unicast RRC message can only be received by UEs in an RRC connected mode, but may reduce power consumption by only signaling UEs that are subscribed to MB services. Furthermore, some techniques and apparatuses described herein reduce power consumption by partitioning MB services into multiple sets of MB services and using separate notifications, to indicate a change in MB control information, for different sets of MB services. In this example, UEs that are not subscribed to a set of MB services need not obtain MB control information upon receiving a notification of a change in MB control information for that set of MB services, thereby reducing power consumption and extending battery life. Furthermore, some techniques and apparatuses described herein conserve system overhead and network resources by using a short message indicator in downlink control information to indicate a change in MB control information.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some examples, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
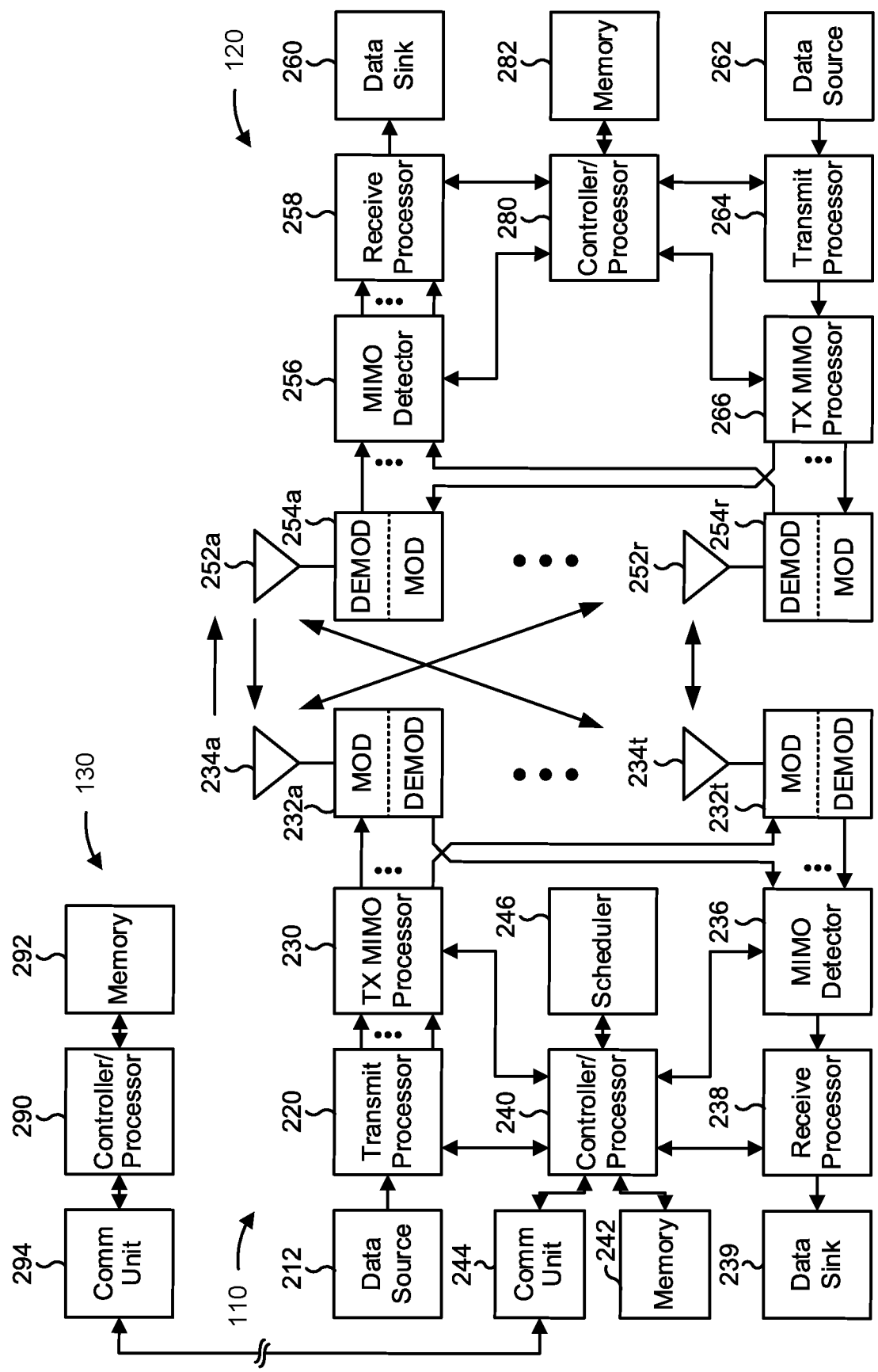
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with multicast broadcast control information, as described in more detail elsewhere herein. For example, controller/processor 240 of base station 110, controller/processor 280 of UE 120, or any other component(s) of FIG. 2 may perform or direct operations of, for example, the process 1100 of FIG. 11, the process 1200 of FIG. 12, the process 1300 of FIG. 13, the process 1400 of FIG. 14, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a notification of a change to MB control information associated with at least one MB service to which the UE 120 is subscribed, the MB control information being included in an MBCCH scheduled by a PDCCH communication addressed to an MB-RNTI; means for monitoring one or more resources of the MBCCH to receive updated MB control information based at least in part on receiving the notification of the change to the MB control information; or a combination thereof. Additionally or alternatively, UE 120 may include means for receiving a notification of a change to MB control information associated with at least one MB service to which the UE 120 is subscribed, the MB control information being included in a SIB scheduled by a PDCCH communication addressed to an SI-RNTI; means for monitoring the SIB to receive updated MB control information based at least in part on receiving the notification of the change to the MB control information; or a combination thereof. Additionally or alternatively, UE 120 may include means for receiving a notification of a change to MB control information associated with at least one MB service to which the UE 120 is subscribed, the MB control information being included in a unicast RRC message scheduled by a PDCCH communication addressed to a C-RNTI; means for monitoring the unicast RRC message to receive updated MB control information based at least in part on receiving the notification of the change to the MB control information; or a combination thereof. In some aspects, such means may include one or more components of UE 120 described in connection with FIG. 2.

In some aspects, base station 110 may include means for transmitting a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; means for transmitting updated MB control information based at least in part on transmitting the notification of the change to the MB control information; or a combination thereof. In some aspects, such means may include one or more components of base station 110 described in connection with FIG. 2.

Figure 3:
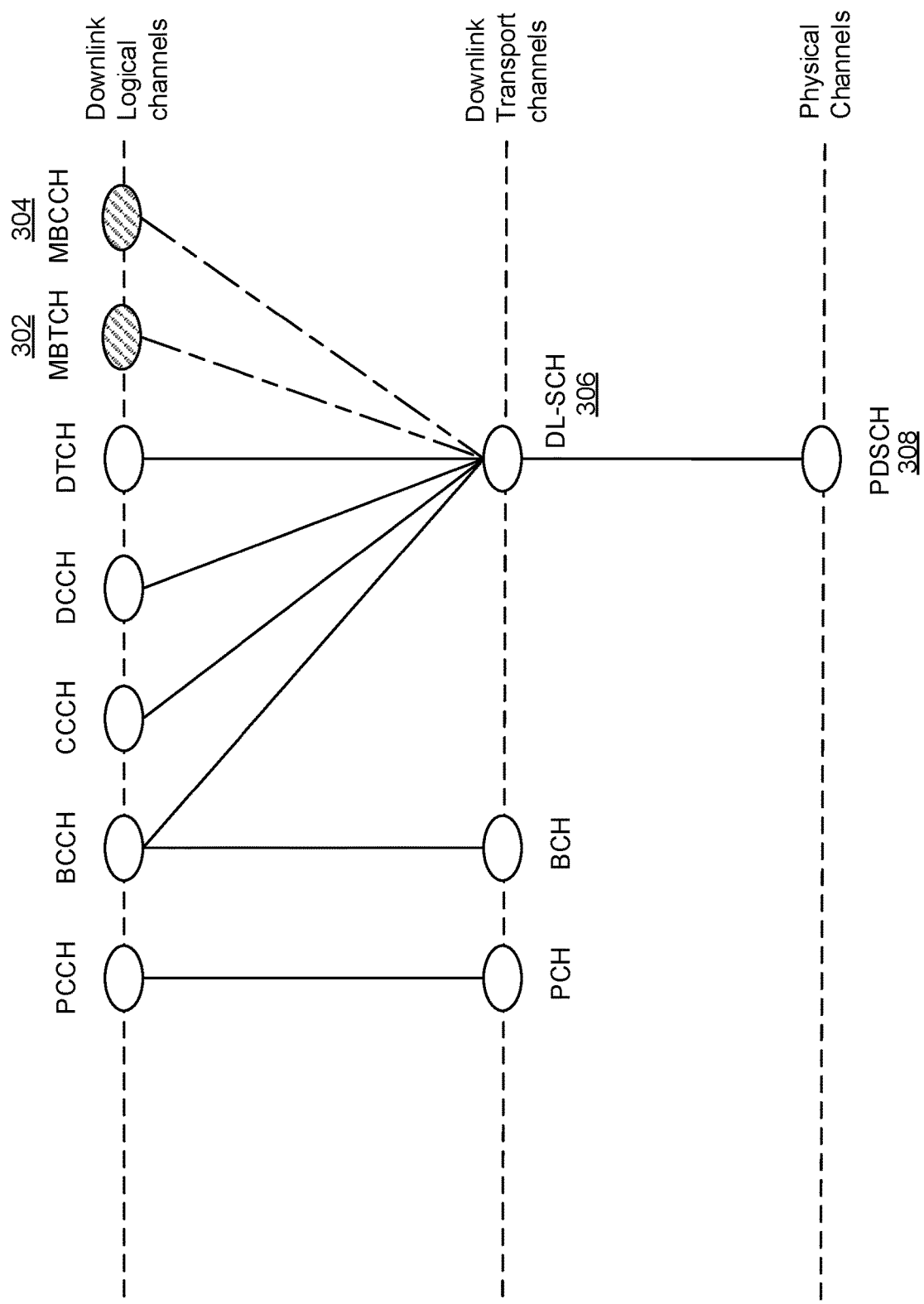
FIG. 3 is a diagram illustrating an example channel mapping for multicast broadcast communications in accordance with various aspects of the present disclosure.

FIG. 3 is a diagram illustrating an example channel mapping for multicast broadcast communications in accordance with various aspects of the present disclosure. In some aspects, multicast or broadcast transmissions in NR may be supported using a multicast broadcast traffic channel (MB-TCH) 302 and a multicast broadcast control channel (MBCCH) 304. The MBTCH 302 may carry multicast or broadcast data, while the MBCCH 304 may carry configuration information or control information for multicast or broadcast communications to be transmitted on the MBTCH 302. A multicast or broadcast communication on the MBTCH 302 may be addressed to a group of UEs using a group radio network temporary identifier (G-RNTI).

In some aspects, different MBTCHs 302 may be used to carry multicast broadcast traffic with different quality of service (QoS) requirements. A multicast/broadcast traffic flow with associated QoS requirements or QoS parameters (for example, a group of related packets for the same multicast/broadcast service) may be referred to as an MB-QoS flow. In some aspects, there may be a one-to-one mapping between MB-QoS flows and MBTCHs 302. A base station or a core network device may configure a multicast broadcast radio bearer (MRB) for an MB-QoS flow. In some aspects, there may be a one-to-one mapping between MB-QoS flows and MRBs. Thus, each MBTCH 302 may correspond to an MRB for carrying an MB-QoS flow.

The MBCCH 304 may carry configuration information for configuring the MBTCHs 302, and may be addressed to all UEs in a cell (for example, a physical cell or a virtual cell) using a single cell RNTI (SC-RNTI). In some aspects, there is a single MBCCH 304 per cell (physical cell or virtual cell), and the MBCCH 304 carries MBTCH configuration information for multiple multicast/broadcast services with different MB-QoS flows. The MBCCH 304 and the MBTCH 302 are logical channels, and may be mapped to a downlink shared channel (DL-SCH) transport channel 306, which may be mapped to the PDSCH 308.

The MBCCH 304 may carry multicast broadcast (MB) control information (for example, in an NR BroadcastMulticastConfiguration message) for the MBTCH 302, such as for an MRB of the MBTCH 302. The MB control information may include information usable by the UE 120 to receive an MB service (for example, via the MBTCH 302). For example, MB control information may indicate a list of G-RNTIs and corresponding MB services, a mapping between MB-QoS flows and G-RNTIs, a mapping between temporary mobile group identities (TMGIs) and G-RNTIs, a mapping between logical channel identifiers (LCIDs) and G-RNTIs, a control resource set (CORESET) configuration for the MBTCH 302, a set of time domain resources allocated for the MBTCH 302, a set of frequency domain resources allocated for the MBTCH 302, or one or more discontinuous reception (DRX) parameters associated with the MBTCH 302, among other examples.

In some MB system designs, the MBCCH 304 may be used to carry MB control information. An MBCCH communication (for example, carrying MB control information for MB communications) may be scheduled by a PDCCH communication that is addressed to a multicast broadcast RNTI (MB-RNTI or M-RNTI). The PDCCH communication and corresponding MBCCH communication may be received by UEs 120 in a radio resource control (RRC) connected mode, an RRC idle mode, and an RRC inactive mode. Thus, this system design is flexible and can be used for all UEs 120 regardless of an RRC mode of a UE 120.

However, other MB system designs may be introduced in NR without the necessity of introducing a new logical channel, such as the MBCCH 304. For example, MB control information may be carried in a system information block (SIB). The SIB may be scheduled by a PDCCH communication addressed to a system information RNTI (SI-RNTI). Similar to the MBCCH design, the PDCCH communication and the SIB may be received by UEs 120 in an RRC connected mode, an RRC idle mode, and an RRC inactive mode. Thus, this system design is flexible and can be used for all UEs 120 regardless of an RRC mode of a UE 120. However, when the MB control information changes, such a change may be signaled as a system information update. This may impact UEs 120 that are not subscribed to MB services, and may cause those UEs 120 to unnecessarily obtain updated system information, thereby increasing power consumption and reducing battery life.

In another MB system design, MB control information may be carried in a unicast RRC message between a base station 110 and a UE 120. The unicast RRC message may be scheduled by a PDCCH communication addressed to a cell RNTI (C-RNTI). In this example, the MB control information can be received by UEs 120 in an RRC connected mode, but not UEs 120 in an RRC idle mode or an RRC inactive mode. Because UEs 120 in an RRC idle mode or an RRC inactive mode may be capable of receiving MB services, this MB system design may be inefficient. However, this MB system design impacts only UEs 120 that are subscribed to MB services, thereby reducing power consumption of UEs 120 as compared to the SIB design described above.

When the MB control information is updated, a base station 110 may need to signal such change to UEs 120 served by the base station 110 so that UEs 120 subscribed to MB services can obtain the updated MB control information. Some signaling techniques may be more suitable for some MB system designs as compared to other MB system designs. For example, a signaling technique that improves performance or reduces UE power consumption in one MB system design may not achieve the same results in another MB system design. Some techniques and apparatuses described herein improve performance of MB control information monitoring, as well as signaling of changes to MB control information, for various MB system designs. For example, some techniques and apparatuses described herein partition MB services into multiple sets of MB services and use a separate notification, for each set of MB services, to indicate a change in MB control information for a corresponding set of MB services. As a result, UEs that are not subscribed to a set of MB services need not obtain MB control information upon receiving a notification of a change in MB control information for that set of MB services, thereby reducing power consumption and extending battery life. Furthermore, some techniques and apparatuses conserve system overhead and network resources by using a short message indicator in downlink control information to indicate a change in MB control information.

Figure 4:
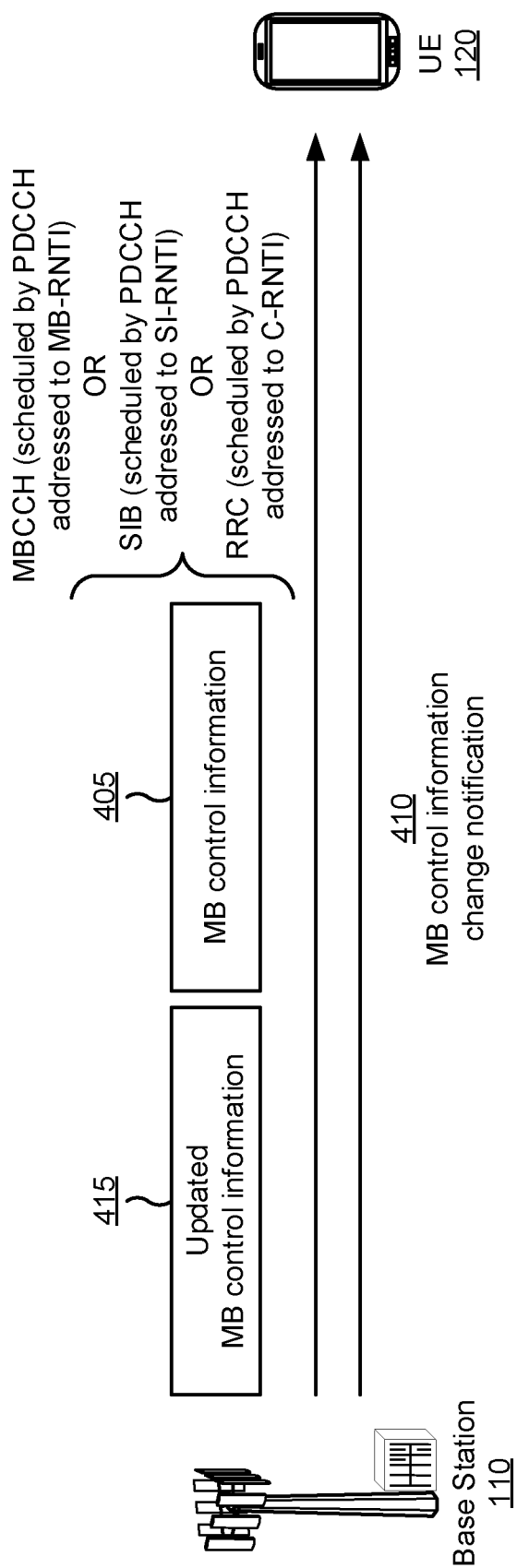
FIG. 4 is a diagram illustrating an example of a multicast broadcast control information flow in accordance with various aspects of the present disclosure.

FIG. 4 is a diagram illustrating an example of a multicast broadcast control information flow in accordance with various aspects of the present disclosure. As shown in FIG. 4, a base station 110 and a UE 120 may communicate with one another.

As shown in FIG. 4, the base station 110 may transmit MB control information 405 to the UE 120. The MB control information 405 may include information usable by the UE 120 to receive one or more MB services. For example, the MB control information 405 may indicate a list of G-RNTIs and corresponding MB services, a mapping between MB-QoS flows and G-RNTIs, a mapping between TMGIs and G-RNTIs, a mapping between LCIDs and G-RNTIs, a CORESET configuration for one or more MB services, a set of time domain resources allocated for one or more MB services, a set of frequency domain resources allocated for one or more MB services, or one or more DRX parameters associated with MB communications, among other examples. In some aspects, the UE 120 may monitor for a message that includes MB control information 405 for all MB services provided in a service area of the UE 120 (for example, a coverage area of the base station 110 or one or more neighbor base stations 110). Alternatively, the UE 120 may monitor for a message that includes MB control information 405 for only those MB services of interest to the UE 120 or only those MB services to which the UE 120 is subscribed.

As further shown, in one MB system design, the MB control information 405 may be carried in an MBCCH (for example, in an MBCCH communication). The MBCCH communication may be scheduled by a PDCCH communication addressed to an MB-RNTI. In another MB system design, the MB control information 405 may be carried in a SIB. The SIB may be scheduled by a PDCCH communication addressed to an SI-RNTI. In another MB system design, the MB control information 405 may be carried in an RRC message (for example, an RRC configuration message or an RRC reconfiguration message, among other examples), such as a unicast RRC message. The RRC message may be scheduled by a PDCCH communication addressed to a C-RNTI.

As further shown in FIG. 4, the base station 110 may transmit, to the UE 120, a notification of a change to the MB control information 405. This notification may be referred to herein as an MB control information change notification 410 or as a change notification 410. The manner in which the MB control information change notification 410 is transmitted by the base station 110 and received by the UE 120 may depend on an MB system design, such as whether the MB control information 405 is included in an MBCCH communication, a SIB, or an RRC message, among other examples. Additionally or alternatively, the signaling included in the MB control information change notification 410 may depend on the MB system design. In some aspects, the UE 120 may monitor for an MB control information change notification 410 that is triggered by a change to any MB service provided in a service area of the UE 120. Alternatively, the UE 120 may monitor for an MB control information change notification 410 that is triggered by a change to only those MB services of interest to the UE 120 or only those MB services to which the UE 120 is subscribed.

As further shown in FIG. 4, the UE 120 may obtain updated MB control information 415, such as by monitoring for and receiving the updated MB control information 415, based at least in part on receiving the MB control information change notification 410. In some aspects, the UE 120 may monitor one or more resources allocated to MB control information 405/415 based at least in part on receiving the MB control information change notification 410. The manner in which the UE 120 obtains updated MB control information 415 may depend on the MB system design.

Additional details regarding an MB control information change notification 410 for MB control information 405 included in an MBCCH communication are described below in connection with FIGS. 5-7. Additional details regarding an MB control information change notification 410 for MB control information 405 included in a SIB are described below in connection with FIGS. 8 and 9. Additional details regarding an MB control information change notification 410 for MB control information 405 included in an RRC message are described below in connection with FIG. 10.

Figure 5:
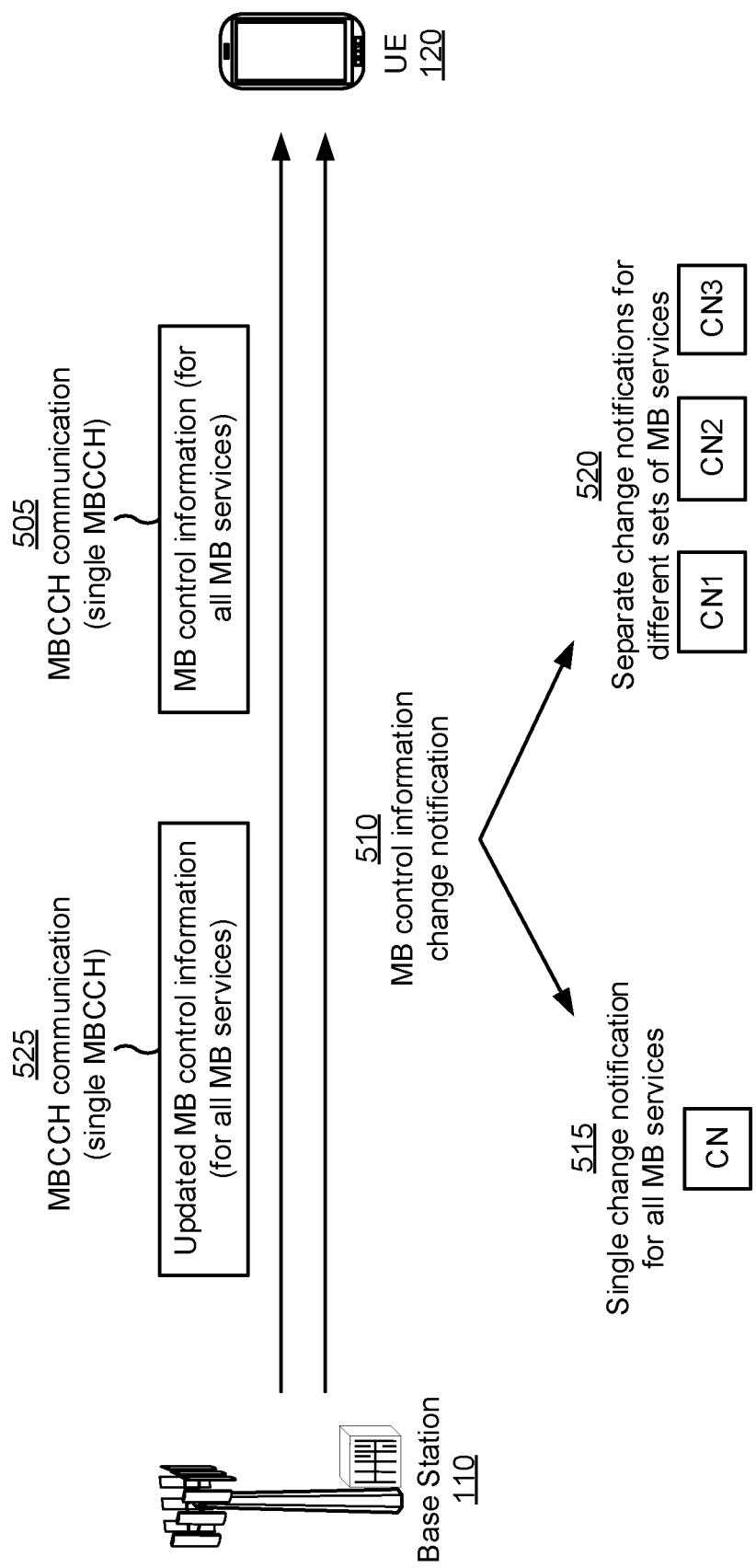
FIG. 5 is a diagram illustrating another example of a multicast broadcast control information flow in accordance with various aspects of the present disclosure.

FIG. 5 is a diagram illustrating another example of a multicast broadcast control information flow in accordance with various aspects of the present disclosure. As shown in FIG. 5, a base station 110 and a UE 120 may communicate with one another.

As shown in FIG. 5, the base station 110 may transmit MB control information 505 to the UE 120. As shown, the MB control information 505 may be carried in an MBCCH (for example, in an MBCCH communication). The MBCCH communication may be scheduled by a PDCCH communication addressed to an MB-RNTI. In the example of FIG. 5, the MB system design uses a single MBCCH to carry control information for all MB services that are provided in a service area associated with the MBCCH (for example, a coverage area of the base station 110).

As further shown in FIG. 5, the base station 110 may transmit, to the UE 120, an MB control information change notification 510. In the example of FIG. 5, where a single MBCCH carries control information for all MB services, there may be a single change notification 515 used for all MB services in the service area, or the MB services in the service area may be partitioned into multiple sets of MB services and a separate change notification 520 (for example, transmitted using a different field in the same channel (for example, the PDCCH) or a same downlink control information (DCI), or transmitted using a different set of time-frequency resources than other change notifications 520) may be used for each set of MB services. In some aspects, the base station 110 may group MB services based at least in part on an update cycle associated with MB services, such that MB services with a similar update cycle (for example, that have a similar periodicity to changes in MB control information 505) are included in the same set of MB services.

For example, the base station 110 may use a single change notification 515 for all MB services. In this example, the base station 110 may trigger transmission of the single change notification 515 based at least in part on a change to any MB service associated with the service area of the base station 110. In this example, when the UE 120 receives the single change notification 515, the UE 120 may obtain updated MB control information 525. For example, the UE 120 may obtain the updated MB control information 525 via the MBCCH, in a similar manner as described above in connection with the MB control information 505. In some aspects, the UE 120 may read a portion of the MBCCH communication that includes the MB control information 505/525 to identify MB control information 505/525 associated with one or more MB services to which the UE 120 is subscribed. In some examples, the MB control information 505/525 for the MB service(s) to which the UE 120 is subscribed may not have changed from a time prior to the change to the MB control information 505/525, but the UE 120 may still obtain the MB control information 505/525 due to this MB system design. In other words, if a single change notification 515 is used for all MB services, the UE 120 may obtain updated MB control information 525 upon receiving the single change notification 515 regardless of whether an MB service to which the UE 120 is subscribed triggered the single change notification 515 (for example, regardless of whether the updated MB control information 525 has changed for an MB service to which the UE 120 is subscribed).

As another example, the base station 110 may use separate change notifications 520 for different sets of MB services. In some aspects, each set of MB services is a different subset of all of the MB services in a service area of the base station 110. In this example, the base station 110 may trigger transmission of a change notification 520 associated with a set of MB services (for example, a set of one or more MB services) based at least in part on a change to one or more MB services included in that set of MB services. In this example, if the UE 120 receives the change notification 520 for the set of MB services, then the UE 120 may obtain updated MB control information 525 only if the UE 120 is subscribed to an MB service included in the set of MB services. In other words, if the UE 120 receives a change notification 520 associated with a set of MB services to which the UE 120 is not subscribed, then the UE 120 may refrain from monitoring for updated MB control information 525 based at least in part on receiving that change notification 520. In some aspects, the base station 110 may indicate (for example, in a SIB or an RRC message, among other examples) different resources in which different change notifications 520 are scheduled, and the UE 120 may monitor for only the change notification(s) 520 associated with the MB service(s) to which the UE 120 is subscribed. In this way, power consumption of the UE 120 may be reduced.

In some aspects, change notifications 520 for different sets of MB services may be transmitted or monitored with different periodicities. For example, a set of MB services with a longer update cycle may be associated with a change notification 520 with a longer periodicity, and a set of MB services with a shorter update cycle may be associated with a change notification 520 with a shorter periodicity. When the change notifications 520 for different set of services or different MBCCHs are transmitted on different channels, the change notifications 520 can be transmitted with different periodicities according to a service update cycle. When the change notifications 520 for different set of services or different MBCCHs are transmitted on the same channel, the change notifications 520 can be sent with a shorter periodicity, and the UE 120 can monitor the change notifications 520 based on different periodicities (for example, configured by the base station 110) according to the service update cycle. This may conserve UE battery power while also assisting UEs 120 with receiving updated MB control information 525.

Figure 6:
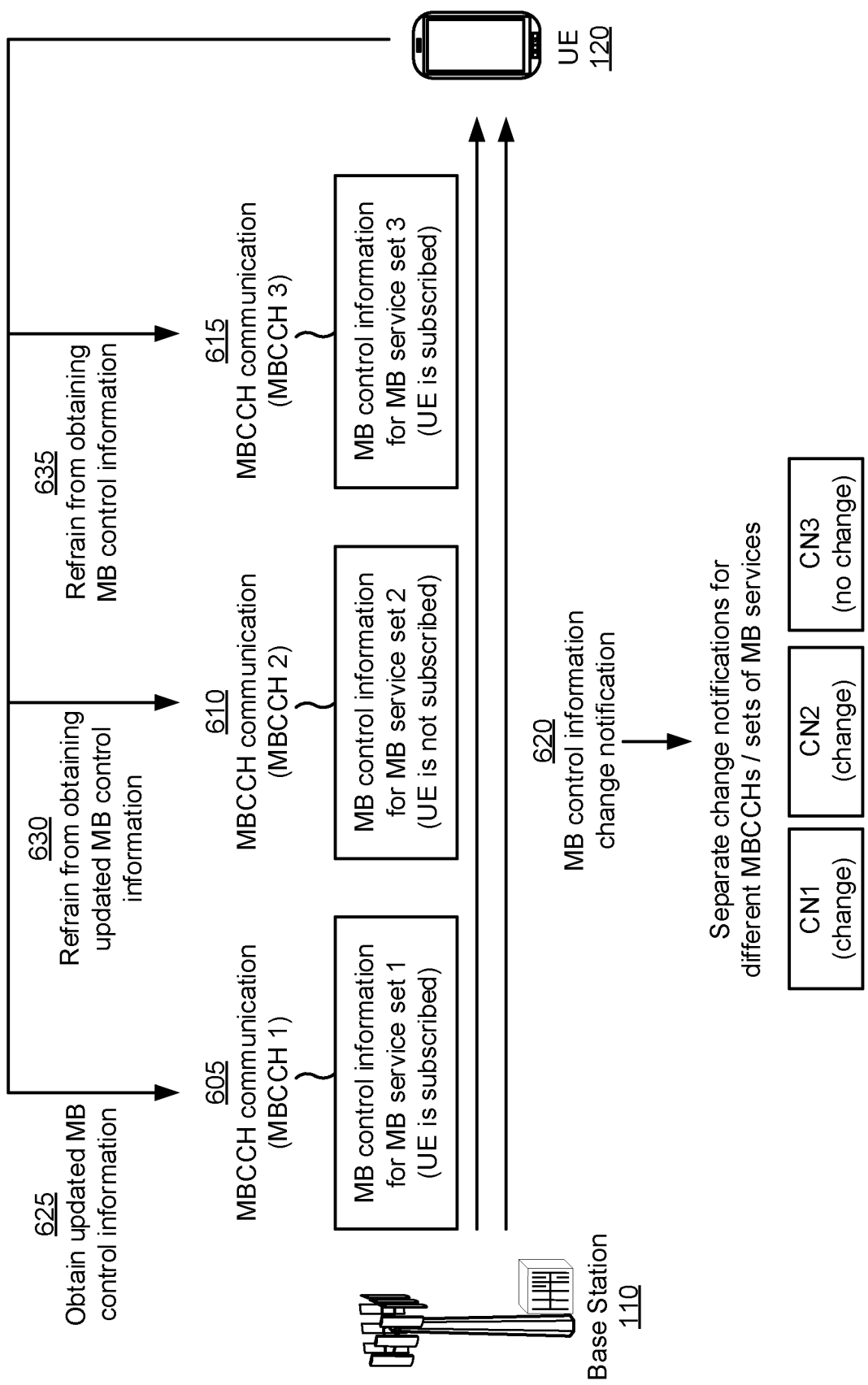
FIG. 6 is a diagram illustrating another example of a multicast broadcast control information flow in accordance with various aspects of the present disclosure.

FIG. 6 is a diagram illustrating another example of a multicast broadcast control information flow in accordance with various aspects of the present disclosure. As shown in FIG. 6, a base station 110 and a UE 120 may communicate with one another. In the example of FIG. 6, the MB system design includes multiple MBCCHs, rather than a single MBCCH described above in connection with FIG. 5. In some aspects, each MBCCH, of the multiple MBCCHs, may occupy a different set of time-frequency resources than every other MBCCH of the multiple MBCCHs. For example, different MBCCHs may have different resource allocations (for example, within a PDSCH). Additionally or alternatively, each MBCCH may be associated with a different set of MB services (for example, a different subset of all of the MB services in a service area of the base station 110). For example, each MBCCH may carry MB control information for a different set of MB services. In some aspects, different MBCCHs may be associated with different transmission configurations, such as different repetition periods, different modification periods, or different on durations for MBCCH scheduling, among other examples.

As shown in FIG. 6, the base station 110 may transmit a first MBCCH communication 605, via a first MBCCH (shown as MBCCH 1), that includes MB control information for a first set of MB services (shown as MB service set 1). As further shown, the base station 110 may transmit a second MBCCH communication 610, via a second MBCCH (shown as MBCCH 2), that includes MB control information for a second set of MB services (shown as MB service set 2). As further shown, the base station 110 may transmit a third MBCCH communication 615, via a third MBCCH (shown as MBCCH 3), that includes MB control information for a third set of MB services (shown as MB service set 3). Three MBCCHs associated with a corresponding three MB service sets are shown in FIG. 6 as an example. In practice, a different number of MBCCHs and MB services sets may be used. As further shown in FIG. 6, the UE 120 may be subscribed to an MB service included in MB service set 1 and an MB service included in MB service set 3, and may not be subscribed to any MB services in MB service set 2. The first MBCCH communication 605, the second MBCCH communication 610, and the third MBCCH communication 615 may be scheduled by a PDCCH communication addressed to an MB-RNTI (for example, a single PDCCH communication for all of the MBCCHs or a different PDCCH communication for each MBCCH).

In some aspects, the base station 110 may indicate, to the UE 120, a set of MB services corresponding to an MBCCH in a configuration message (for example, an RRC message). For example, the configuration message may indicate each MBCCH and a respective set of MB services corresponding to each MBCCH. Additionally or alternatively, the UE 120 can indicate the MB service(s) of interest to the base station 110, and the base station 110 can signal, to the UE 120, the corresponding MBCCH(s) to monitor based on those MB service(s) of interest. In this way, power consumption of the UE 120 may be reduced by monitoring MB control information for only the MB services in which the UE 120 is interested or is subscribed.

In some aspects, different MBCCHs may be associated with different MB-RNTIs. In this example, a PDCCH communication, that schedules an MBCCH communication associated with a specific MB-RNTI, may be addressed to the specific MB-RNTI. Furthermore, PDCCH communications that schedule MBCCH communications for different MBCCHs may be addressed to different MB-RNTIs. In this example, different MBCCHs may use overlapping scheduling windows, may use the same hybrid automatic repeat request (HARQ) process or the same set of HARQ processes, and may use the same LCID or the same set of LCIDs.

Alternatively, different MBCCHs may be associated with (for example, may share) the same MB-RNTI. For example, a PDCCH communication, that schedules multiple MBCCH communications associated with the same MB-RNTI, may be addressed to the same MB-RNTI. In this example, different MBCCHs that share an MB-RNTI may be associated with different non-overlapping scheduling windows. For example, a first set of time-frequency resources used for a first MBCCH may be different from a second set of time-frequency resources used for a second MBCCH that shares an MB-RNTI with the first MBCCH. Additionally or alternatively, a first PDCCH communication that schedules MBCCH communications for a first MBCCH may occur in a first set of time-frequency resources, and a second PDCCH communication that schedules MBCCH communications for a second MBCCH, that shares an MB-RNTI with the first MBCCH, may occur in a second set of time-frequency resources. In this example, the UE 120 may differentiate the MBCCHs based at least in part on a scheduling window used for an MBCCH.

Additionally or alternatively, different MBCCHs that share an MB-RNTI may be associated with different HARQ processes (and different HARQ process identifiers). For example, a first HARQ process identifier or a first set of HARQ process identifiers may be used for a first MBCCH, and a second HARQ process identifier or a second set of HARQ process identifiers may be used for a second MBCCH that shares an MB-RNTI with the first MBCCH. In this example, the different MBCCHs may use an overlapping scheduling window (and may also use the same LCID, in some aspects), and the UE 120 may differentiate the MBCCHs based at least in part on a HARQ process identifier used for an MBCCH.

Additionally or alternatively, different MBCCHs that share an MB-RNTI may be associated with different LCIDs. For example, a first LCID or a first set of LCIDs may be used for a first MBCCH, and a second LCID or a second set of LCIDs may be used for a second MBCCH that shares an MB-RNTI with the first MBCCH. In this example, the different MBCCHs may use an overlapping scheduling window (and may use the same HARQ process identifier(s), in some aspects), and the UE 120 may differentiate the MBCCHs based at least in part on an LCID used for an MBCCH.

In some aspects, different MBCCHs may correspond to different bandwidth part configurations. For example, different sets of MB services may be provided in different bandwidth parts (or for different bandwidth part configurations). In some aspects, a first set of MB services may be provided in a bandwidth part with a wider bandwidth (for example, a first set of MB services that has more content), and a second set of MB services may be provided in a bandwidth part with a narrower bandwidth (for example, a second set of MB services that has less content).

As further shown in FIG. 6, the base station 110 may transmit, to the UE 120, an MB control information change notification 620. In the example of FIG. 6, where different MBCCHs carry control information for different sets of MB services, the base station 110 may use a separate change notification 620 for each MBCCH. For example, the base station 110 may transmit each change notification 620 using a different field in the same channel (for example, the PDCCH) or a same downlink control information (DCI), or using a different set of time-frequency resources than other change notifications 620. In this example, the base station 110 may trigger transmission of a change notification 620 associated with a set of MB services (or an MBCCH that carries control information for that set of MB services) based at least in part on a change to one or more MB services included in that set of MB services. In this example, if the UE 120 receives the change notification 620 for the set of MB services, then the UE 120 may obtain updated MB control information only if the UE 120 is subscribed to an MB service included in the set of MB services.

For example, as shown in FIG. 6, the base station 110 may transmit a first change notification (shown as CN1) for MB service set 1 and may transmit a second change notification (shown as CN2) for MB service set 2. The first change notification may indicate that MB control information for MB service set 1 has changed (for example, from a time at which prior MB control information for MB service set 1 was transmitted). Similarly, the second change notification may indicate that MB control information for MB service set 2 has changed. The MB control information for MB service set 3 may not have changed since a prior time at which a change notification 620 for MB service set 3 was scheduled to be transmitted, and so the base station 110 may refrain from transmitting a change notification 620 for MB service set 3. Alternatively, the base station 110 may transmit a third change notification (shown as CN3) for MB service set 3, and the third change notification may indicate that MB control information for MB service set 3 has not changed.

In some aspects, the base station 110 may indicate, to the UE 120, one or more resources that carry a change notification 620. The UE 120 may monitor the one or more resources based at least in part on receiving the indication. In some aspects, the base station 110 may indicate different sets of resources for different change notifications 620 (for example, corresponding to different MB service sets or different MBCCHs), and the UE 120 may monitor for only the change notifications 620 associated with an MB service to which the UE 120 is subscribed.

As further shown, the UE 120 may obtain updated MB control information 625 for MB service set 1, such as by monitoring one or more resources of MBCCH 1 for MB control information 625. In the example of FIG. 6, the UE 120 may obtain the updated MB control information 625 for MB service set 1 because the UE 120 is subscribed to one or more MB services included in MB service set 1 and because the UE 120 received a change notification 620 for MB service set 1.

As further shown, the UE 120 may refrain from obtaining updated MB control information 630 for MB service set 2. In the example of FIG. 6, the UE 120 may refrain from obtaining the updated MB control information 630 for MB service set 2 even if the UE 120 receives a change notification 620 for MB service set 2 because the UE 120 is not subscribed any MB services included in MB service set 2.

As further shown, the UE 120 may refrain from obtaining MB control information 635 for MB service set 3. In the example of FIG. 6, the UE 120 may refrain from obtaining the MB control information 635 for MB service set 3 even if the UE 120 is subscribed to one or more MB services included in MB service set 3 because the UE 120 did not receive a change notification 620 for MB service set 3 (or received a change notification 620 indicating that MB control information 635 for MB service set 3 has not changed).

In some aspects, the base station 110 may indicate, to the UE 120, addition of a new MB service to a service area of the base station 110. In some aspects, the UE 120 may monitor for updated MB control information associated with the new MB service. In some aspects, the base station 110 may indicate an MBCCH or an MB service group for the new MB service, and the UE 120 may monitor that MBCCH to obtain MB control information for the new MB service. In this way, the UE 120 may reduce power consumption as compared to monitoring for all MB control information (for example, on all MBCCHs) for the new MB service.

Figure 7:
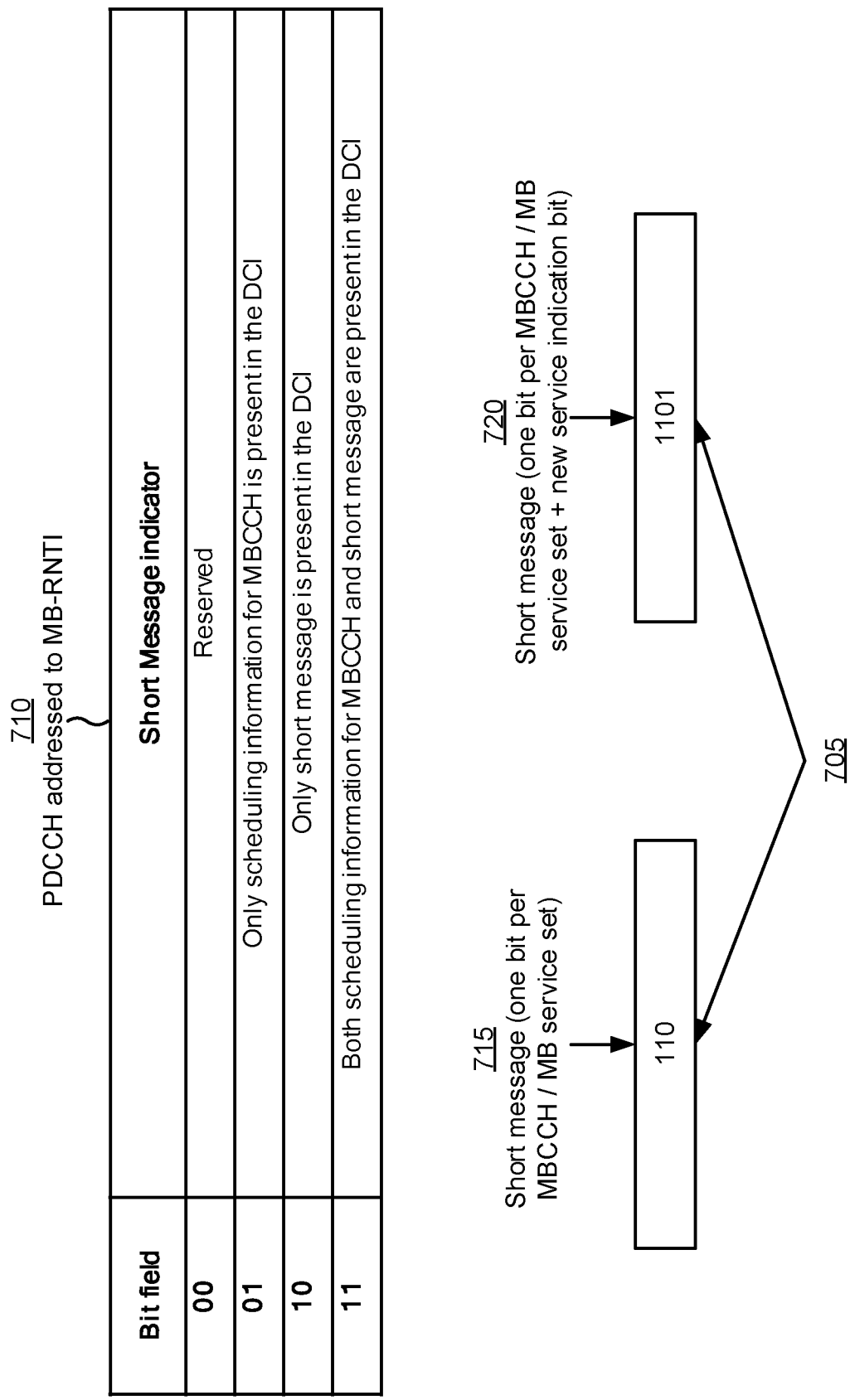
FIG. 7 is a diagram illustrating an example of a multicast broadcast control information change notification in accordance with various aspects of the present disclosure.

FIG. 7 is a diagram illustrating an example of a multicast broadcast control information change notification in accordance with various aspects of the present disclosure. FIG. 7 shows an example of a change notification 705 carried in a PDCCH communication. The change notification 705 shown in FIG. 7 may be used to notify a UE 120 of a change to MB control information for an MB system design that uses one or more MBCCHs, as described above in connection with FIGS. 5 and 6. As shown in FIG. 7, in some aspects, a change notification 705 may be included in a PDCCH communication 710 (also referred to as DCI). In some aspects, the PDCCH communication 710 may be addressed to an MB-RNTI, as shown in FIG. 7.

As further shown, the PDCCH communication 710 may include an indication of whether the PDCCH communication 710 includes scheduling information for the MBCCH and not a notification of a change (shown as a bit value of 01 in a bit field), whether the PDCCH communication 710 includes a notification of a change and not scheduling information (shown as a bit value of 10 in the bit field), or whether the PDCCH communication 710 includes both scheduling information and a notification of a change (shown as a bit value of 11 in the bit field). In some aspects, the change notification 705 may be referred to as a short message, and the PDCCH communication 710 may indicate whether the PDCCH communication 710 includes the short message (for example, using a short message indicator). The scheduling information for the MBCCH may indicate, for example, a resource allocation for an MBCCH communication (for example, a set of time-frequency resources), a modulation and coding scheme for the MBCCH communication, or other scheduling information for the MBCCH communication.

In some aspects, the change notification 705 (the short message) may include a bitmap (for example, in a field of the PDCCH communication 710 that carries the change notification 705). Different bits of the bitmap may correspond to different MBCCHs or different set of MB services, which may be associated with different sets of MB services, as described above in connection with FIG. 6. A value of a bit in the bitmap may represent a change notification 705 corresponding to an MBCCH or a set of MB services associated with that bit. For example, a first value of a bit (for example, 0) may indicate that MB control information of an MBCCH or a set of MB services, corresponding to the bit, has not changed, and a second value of the bit (for example, 1) may indicate that MB control information of the MBCCH or the set of MB services has changed. In example bitmap 715 of FIG. 7, a bitmap value of 110 indicates that MB control information for MBCCH 1 or a first set of MB services has changed (represented by a 1 in the first bit in the bitmap), that MB control information for MBCCH 2 or a second set of MB services has changed (represented by a 1 in the second bit in the bitmap), and that MB control information for MBCCH 3 or a third set of MB services has not changed (represented by a 0 in the third bit in the bitmap), which corresponds to the example of FIG. 6. The bitmap 715 may be transmitted in the PDCCH communication 710.

In some aspects, the bitmap may include a bit to indicate whether a new MB service has been added to a service area of the base station 110. In this example, a first value of the bit (for example, 0) may indicate that a new MB service has not been added, and a second value of the bit (for example, 1) may indicate that a new MB service has been added. In example bitmap 720 of FIG. 7, a bitmap value of 1101 indicates that MB control information for MBCCH 1 has changed (represented by a 1 in the first bit in the bitmap), that MB control information for MBCCH 2 has changed (represented by a 1 in the second bit in the bitmap), that MB control information for MBCCH 3 has not changed (represented by a 0 in the third bit in the bitmap), and that a new MB service has been added (represented by a 1 in the fourth bit in the bitmap). The bitmap 720 may be transmitted in the PDCCH communication 710.

Thus, if a service area includes N MB service groups (for example, N sets of MB services), then the bitmap in the short message may include N bits in some aspects, where each of the N bits corresponds to a different set of MB services of the N sets of MB services. Alternatively, the bitmap may include N+1 bits, with one bit for each set of MB services of the N sets of MB services and an additional bit for a new MB service indication.

In some aspects, the base station 110 may indicate, to the UE 120, one or more resources that carry the PDCCH communication 710. The UE 120 may monitor the one or more resources based at least in part on receiving the indication of the one or more resources that carry the PDCCH communication 710. Additionally or alternatively, the base station 110 may indicate a CORESET for the PDCCH communication 710 or a bandwidth part for the PDCCH communication 710, among other examples. In some aspects, a slot for monitoring the PDCCH communication 710 (for example, the change notification 705) may overlap with one or more slots for MBCCH scheduling. In some aspects, the slot for monitoring the PDCCH communication 710 may be a first slot in an MBCCH modification period associated with one or more MBCCHs (for example, a period of time during which MB control information cannot be changed). Alternatively, the base station 110 may indicate (for example, in a SIB or in an RRC message) a slot offset for monitoring the PDCCH communication 710 within the MBCCH modification period. In some aspects, the PDCCH communication 710 may be in the same bandwidth part as an MBCCH PDSCH (for example, the PDSCH used to convey the MBCCH) communication scheduled by the PDCCH communication 710. Alternatively, the PDCCH communication 710 may be in a different bandwidth part than an MBCCH PDSCH communication scheduled by the PDCCH communication 710.

Although FIG. 7 shows the change notification 705 being included in a PDCCH communication addressed to an MB-RNTI, which uses a short message indicator to conserve signaling overhead, in some aspects, the change notification 705 may be included in a message addressed to a different RNTI than the MB-RNTI (and other than a paging RNTI (P-RNTI), in some aspects). For example, the change notification 705 may be included in a message addressed to an MB notification RNTI (MB-N-RNTI). In this example, the PDCCH communication 710 need not include the short message indicator (for example, may include scheduling information without including the change notification 705). In other words, the PDCCH addressed to the MB-RNTI may be dedicated to scheduling the MBCCH while the PDCCH addressed to the MB-N-RNTI may be dedicated for a short message with change notifications 705 for MB services.

Figure 8:
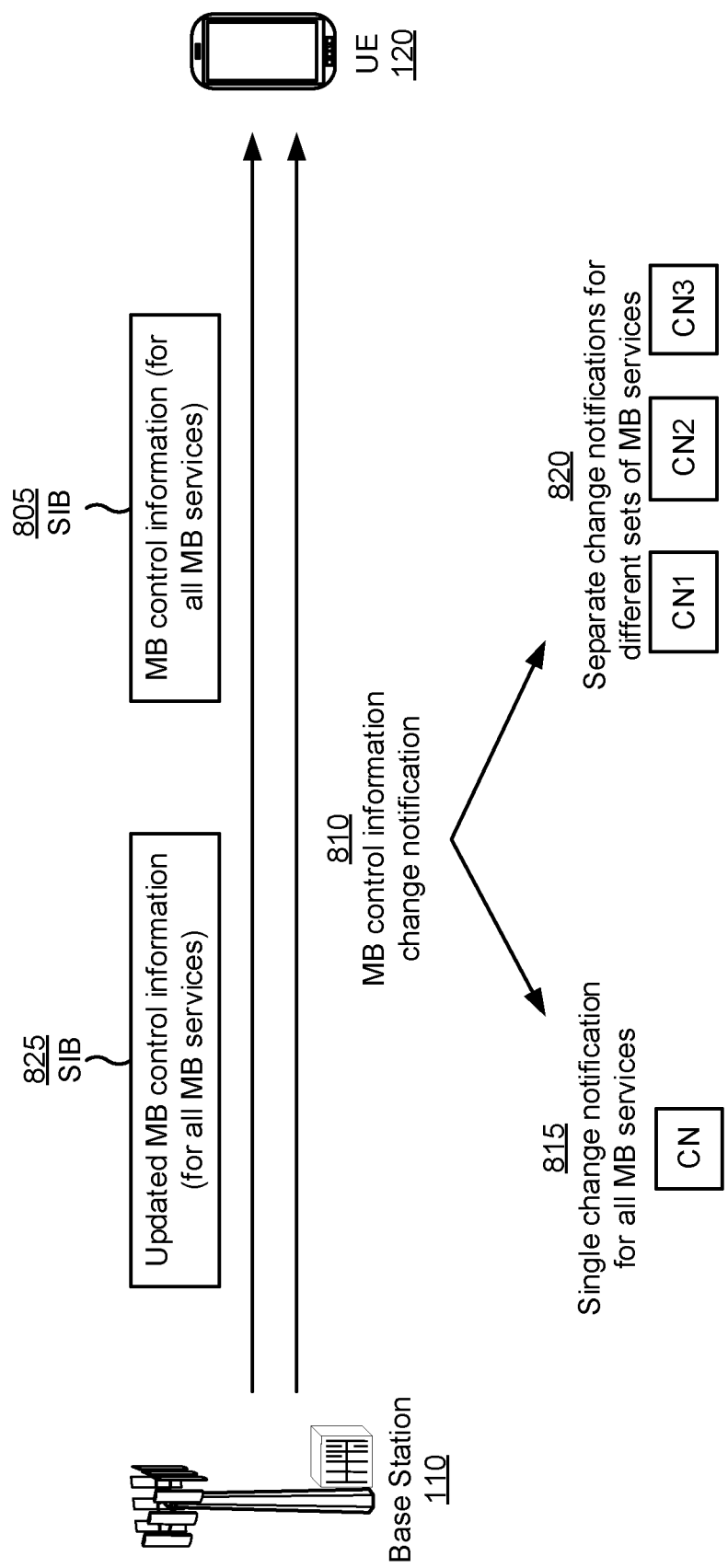
FIG. 8 is a diagram illustrating another example of a multicast broadcast control information flow in accordance with various aspects of the present disclosure.

FIG. 8 is a diagram illustrating another example of a multicast broadcast control information flow in accordance with various aspects of the present disclosure. As shown in FIG. 8, a base station 110 and a UE 120 may communicate with one another. As further shown, the base station 110 may transmit MB control information 805 to the UE 120. As shown, the MB control information 805 may be carried in a SIB. The SIB may be scheduled by a PDCCH communication addressed to an SI-RNTI.

As further shown, the base station 110 may transmit, to the UE 120, an MB control information change notification 810 (also referred to as a change notification 810). The MB control information change notification 810 may be indicated in a field or a message that is different from a field or a message used to indicate a change to system information (for example, one or more SIBs) other than the SIB carrying the MB control information 805. In this way, UEs 120 that are not interested in MB services do not need to reacquire a SIB that has been modified due to a change in the MB control information 805. In the example of FIG. 8, where a SIB carries control information for all MB services, there may be a single change notification 815 used for all MB services in the service area, or the MB services in the service area may be partitioned into multiple sets of MB services and a separate change notification 820 (for example, transmitted using a different field or a different set of time-frequency resources than other change notifications 820) may be used for each set of MB services.

For example, the base station 110 may use a single change notification 815 for all MB services. In this example, the base station 110 may trigger transmission of the single change notification 815 based at least in part on a change to any MB service associated with the service area of the base station 110. In this example, when the UE 120 receives the single change notification 815, the UE 120 may obtain updated MB control information 825. In some aspects, the UE 120 may read a portion of the SIB that includes the MB control information 805/825 to identify MB control information 805/825 associated with one or more MB services to which the UE 120 is subscribed. In some examples, the MB control information 805/825 for the MB service(s) to which the UE 120 is subscribed may not have changed from a time prior to the change to the MB control information 805/825, but the UE 120 may still obtain the MB control information 805/825 due to this MB system design. In other words, if a single change notification 815 is used for all MB services, the UE 120 may obtain updated MB control information 825 upon receiving the single change notification 815 regardless of whether an MB service to which the UE 120 is subscribed triggered the change notification 815 (for example, regardless of whether the updated MB control information 825 has changed for an MB service to which the UE 120 is subscribed).

As another example, the base station 110 may use separate change notifications 820 for different sets of MB services. In some aspects, each set of MB services is a different subset of all of the MB services in a service area of the base station 110. In this example, the base station 110 may trigger transmission of a change notification 820 associated with a set of MB services (for example, a set of one or more MB services) based at least in part on a change to one or more MB services included in that set of MB services. In this example, if the UE 120 receives the change notification 820 for the set of MB services, then the UE 120 may obtain updated MB control information 825 only if the UE 120 is subscribed to an MB service included in the set of MB services. In other words, if the UE 120 receives a change notification 820 associated with a set of MB services to which the UE 120 is not subscribed, then the UE 120 may refrain from monitoring for updated MB control information 825 based at least in part on receiving that change notification 820. Additionally or alternatively, the base station 110 may indicate (for example, in an RRC message) different resources in which different change notifications 820 are scheduled, and the UE 120 may monitor for only the change notification(s) 820 associated with the MB service(s) to which the UE 120 is subscribed. In this way, power consumption of the UE 120 may be reduced.

Figure 9:
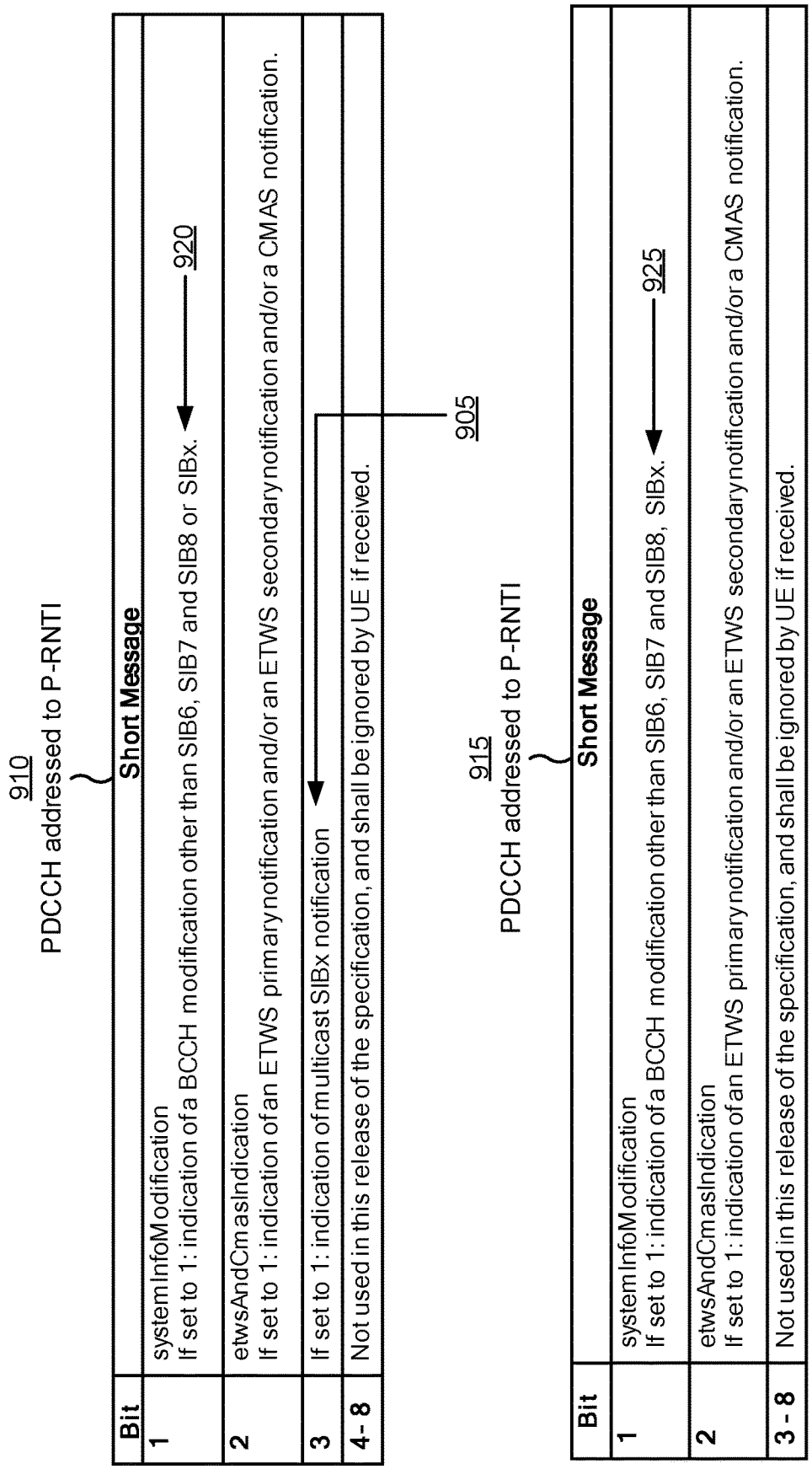
FIG. 9 is a diagram illustrating another example of a multicast broadcast control information change notification in accordance with various aspects of the present disclosure.

FIG. 9 is a diagram illustrating another example of a multicast broadcast control information change notification in accordance with various aspects of the present disclosure. FIG. 9 shows an example of a change notification 905 carried in a PDCCH communication. The change notification 905 shown in FIG. 9 may be used to notify a UE 120 of a change to MB control information for an MB system design that uses a SIB, as described above in connection with FIG. 8. As shown in FIG. 9, in some aspects, a change notification 905 may be included in a PDCCH communication 910 (also referred to as DCI) that is addressed to a paging RNTI (P-RNTI). In some aspects, the base station 110 may indicate a paging occasion or a paging frame in which the UE 120 is to monitor for the PDCCH communication 910 (or a PDCCH communication 915).

As further shown, the PDCCH communication 910 may include at least one of an indication 920 of whether there is a modification to system information other than a set of SIBs (shown as SIB6, SIB7, SIB8, and SIBx) that includes the SIB carrying the MB control information (shown as SIBx), an indication (for example, a change notification 905) of whether there is a modification to the SIB carrying the MB control information, or a combination thereof. For example, a first bit in a short message indication of the PDCCH communication 910 (shown as bit 1) may indicate whether there is a modification to system information other than a set of SIBs (shown as SIB6, SIB7, SIB8, and SIBx) that includes the SIB carrying the MB control information (shown as SIBx). Additionally or alternatively, a second bit in a short message indication of the PDCCH communication 910 (shown as bit 2) may indicate whether the short message is associated with an emergency message, such as an Earthquake and Tsunami Warning System (ETWS) message or a Commercial Mobile Alert System (CMAS) message. Additionally or alternatively, a third bit in a short message indication of the PDCCH communication 910 (shown as bit 3) may indicate whether there is a modification to the SIB carrying the MB control information (shown as SIBx). In some aspects, one or more bits (shown as bits 4 through 8) of the short message indication in the PDCCH communication 910 may be reserved.

In some aspects, if bit 1 (the bit that indicates whether there is a modification to system information other than a set of SIBs that includes the SIB carrying the MB control information) is set to a first value (for example, 0), then a UE 120 may obtain updated system information regardless of whether that UE 120 is interested in or subscribed to MB services. However, if there is an update to MB services but not another SIB (for example, other than SIB6, SIB7, SIB8, or SIBx), then bit 1 may be set to a second value (for example, 1), and a UE 120 that is not interested in or subscribed to MB services may refrain from obtaining system information. In this way, UEs 120 that are not interested in or subscribed to MB services may conserve power by refraining from monitoring for SIBx (for example, based at least in part on a value of bit 1) and may still obtain updates to system information other than SIBx.

In some aspects, if bit 3 (the bit that indicates whether there is a modification to the SIB carrying the MB control information) has a first value (for example, 0), then this may indicate that there is not a modification to the SIB carrying the MB control information (or that the MB control information has not changed). In this example, a UE 120 subscribed to or interested in receiving MB services may refrain from obtaining the SIB. If bit 3 has a second value (for example, 1), then this may indicate that there is a modification to the SIB carrying the MB control information (or that the MB control information has changed). In this example, a UE 120 subscribed to or interested in receiving MB services may obtain the SIB (for example, to obtain updated MB control information).

In some aspects, the PDCCH communication 910 may include an indication of whether there is a modification to a specific set of MB services (for example, when all MB services in a service area are partitioned into multiple sets of MB services). In this example, a bit in the short message may indicate whether there is a modification to MB control information associated with a first set of MB services, another bit in the short message may indicate whether there is a modification to MB control information associated with a second set of MB services, and so on. In this example, one or more of the reserved bits (shown as bits 4 through 8) may be used to indicate whether a specific set of MB services is associated with updated MB control information.

Additionally or alternatively, the PDCCH communication 910 may include an indication of whether a new MB service has been added to the available MB services in a service area. For example, a bit of the short message may indicate whether a new MB service has been added. A first value of the bit may indicate that a new MB service has not been added, and a second value of the bit may indicate that a new MB service has been added. In this example, one or more of the reserved bits (shown as bits 4 through 8) may be used to indicate whether a new MB service has been added.

In some aspects, a PDCCH communication 910 addressed to a P-RNTI may include an indication of whether there is a modification to the SIB carrying the MB control information (shown as bit 3), and a separate paging message (for example, corresponding to the PDCCH communication 910, (for example, a PDSCH communication scheduled by the PDCCH communication 910) may indicate a specific set of MB services associated with a change to MB control information. For example, the paging message may include a bitmap described above in connection with FIG. 7 (for example, bitmap 715 or bitmap 720).

In some aspects, a change notification may be included in a PDCCH communication that is addressed to an RNTI other than a P-RNTI and an SI-RNTI, such as an MB-N-RNTI (sometimes referred to as an M-N-RNTI). This PDCCH communication may include multiple bits for a change notification, and each bit may indicate whether a corresponding set of MB services is associated with a change in MB control information. Additionally or alternatively, this PDCCH communication may include an indication of whether a new MB service has been added, as described elsewhere herein.

When the change notification is included in a PDCCH communication that is addressed to an RNTI other than a P-RNTI and an SI-RNTI, a PDCCH communication 915 addressed to a P-RNTI need not include an indication 925 of whether there is a modification to the SIB carrying the MB control information (shown as SIBx). However, as shown, the PDCCH communication 915 may include an indication 925 of whether there is a modification to system information other than a set of SIBs (shown as SIB6, SIB7, SIB8, and SIBx) that includes the SIB carrying the MB control information (shown as SIBx). For example, a first bit in a short message indication of the PDCCH communication 915 (shown as bit 1) may indicate whether there is a modification to system information other than a set of SIBs (shown as SIB6, SIB7, SIB8, and SIBx) that includes the SIB carrying the MB control information (shown as SIBx). Additionally or alternatively, a second bit in a short message indication of the PDCCH communication 910 (shown as bit 2) may indicate whether the short message is associated with an emergency message, such as an ETWS message or a CMAS message. In some aspects, one or more bits (shown as bits 3 through 8) of the short message indication in the PDCCH communication 915 may be reserved.

Figure 10:
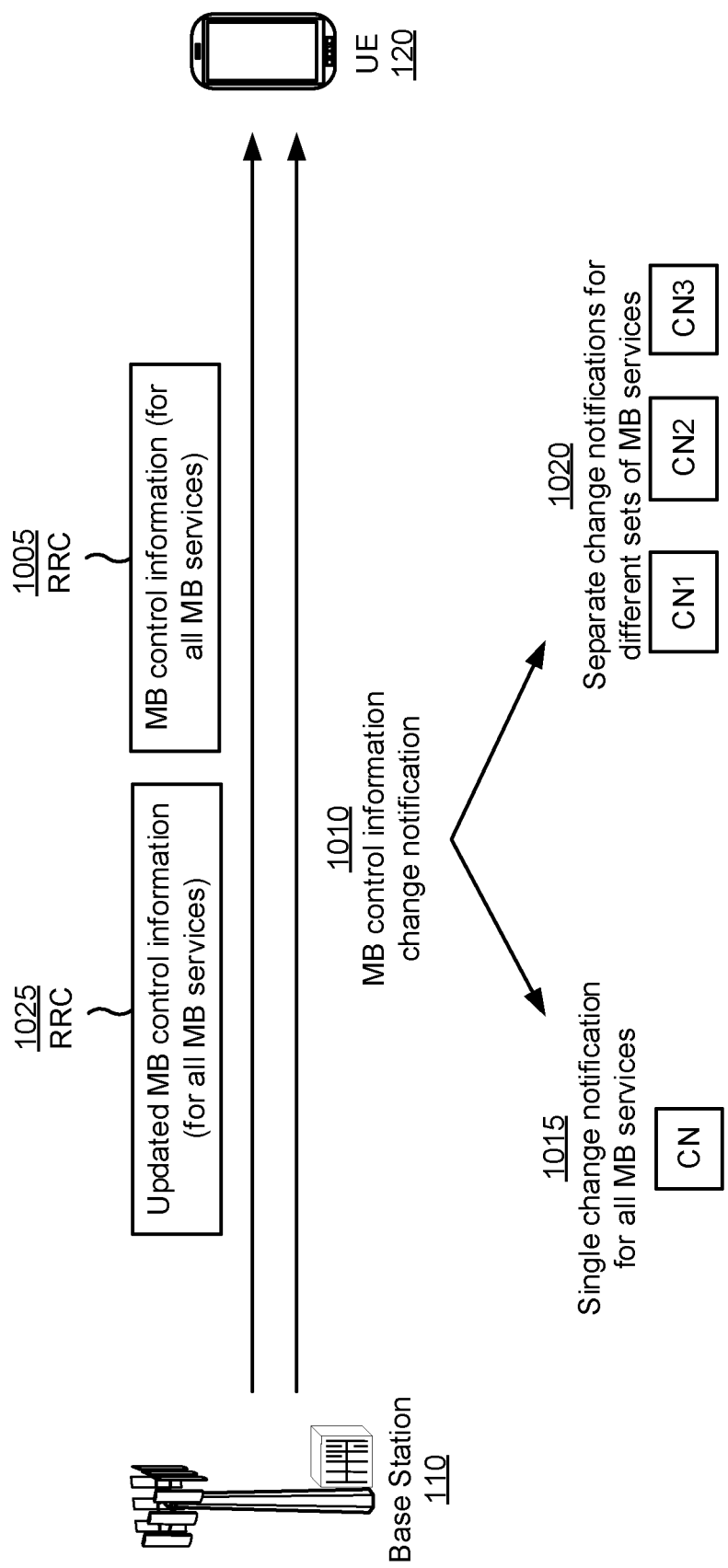
FIG. 10 is a diagram illustrating another example of a multicast broadcast control information flow in accordance with various aspects of the present disclosure.

FIG. 10 is a diagram illustrating another example of a multicast broadcast control information flow in accordance with various aspects of the present disclosure. As shown in FIG. 10, a base station 110 and a UE 120 may communicate with one another. As further shown, the base station 110 may transmit MB control information 1005 to the UE 120. As shown, the MB control information 1005 may be carried in an RRC message, such as a unicast RRC message. The RRC message may be scheduled by a PDCCH communication addressed to a C-RNTI.

As further shown, the base station 110 may transmit, to the UE 120, an MB control information change notification 1010 (also referred to as a change notification 1010). In the example of FIG. 10, where an RRC message carries control information 1005 for all MB services, there may be a single change notification 1015 used for all MB services in the service area, or the MB services in the service area may be partitioned into multiple sets of MB services and a separate change notification 1020 (for example, transmitted using a different field or a different set of time-frequency resources than other change notifications 1020) may be used for each set of MB services.

For example, the base station 110 may use a single change notification 1015 for all MB services. In this example, the base station 110 may trigger transmission of the single change notification 1015 based at least in part on a change to any MB service associated with the service area of the base station 110. In this example, when the UE 120 receives the single change notification 1015, the UE 120 may obtain updated MB control information 1025. For example, the UE 120 may obtain a new RRC message (for example, via an RRC reconfiguration message or via an RRC release procedure and RRC connection establishment procedure). In some aspects, the UE 120 may read a portion of the RRC message that includes the MB control information 1005/1025 to identify MB control information 1005/1025 associated with one or more MB services to which the UE 120 is subscribed. In some examples, the MB control information 1005/1025 for the MB service(s) to which the UE 120 is subscribed may not have changed from a time prior to the change to the MB control information 1005/1025, but the UE 120 may still obtain the MB control information 1005/1025 due to this MB system design. In other words, if a single change notification 1015 is used for all MB services, the UE 120 may obtain updated MB control information 1025 upon receiving the single change notification 1015 regardless of whether an MB service to which the UE 120 is subscribed triggered the change notification 1015 (for example, regardless of whether the updated MB control information 1025 has changed for an MB service to which the UE 120 is subscribed).

As another example, the base station 110 may use separate change notifications 1020 for different sets of MB services. In some aspects, each set of MB services is a different subset of all of the MB services in a service area of the base station 110. In this example, the base station 110 may trigger transmission of a change notification 1020 associated with a set of MB services (for example, a set of one or more MB services) based at least in part on a change to one or more MB services included in that set of MB services. In this example, if the UE 120 receives the change notification 1020 for the set of MB services, then the UE 120 may obtain updated MB control information 1025 only if the UE 120 is subscribed to an MB service included in the set of MB services. In other words, if the UE 120 receives a change notification 1020 associated with a set of MB services to which the UE 120 is not subscribed, then the UE 120 may refrain from monitoring for updated MB control information 1025 based at least in part on receiving that change notification 1020. Additionally or alternatively, the base station 110 may indicate different resources in which different change notifications 1020 are scheduled, and the UE 120 may monitor for only the change notification(s) 1020 associated with the MB service(s) to which the UE 120 is subscribed. In this way, power consumption of the UE 120 may be reduced.

The change notification 1010 may be included in dedicated RRC signaling, in a paging message, or in a short message indication, among other examples. In some aspects, a message used to transmit the change notification 1010 may depend on an RRC mode (sometimes referred to as an RRC state) of the UE 120, such as an RRC connected mode, an RRC idle mode, or an RRC inactive mode. For example, a UE 120 in an RRC connected mode may receive a change notification 1010 via dedicated RRC signaling with the base station 110. For a UE 120 in an RRC inactive mode, the base station 110 may transmit the change notification 1010 to the UE 120 using a radio access network (RAN) paging message, a short message indication, or a PDCCH direct indication (such as a PDCCH direct indication used in eMTC communications), among other examples. For a UE 120 in an RRC idle mode, the base station 110 may transmit the change notification 1010 to the UE 120 using a RAN-initiated paging message (similar to a message used in eMTC to alert UEs 120 of a change to access barring), a short message indication, or a PDCCH direct indication. When a UE 120 in an RRC idle mode or an RRC inactive mode receives the change notification 1010, the UE 120 may enter an RRC connected mode to receive the updated MB control information 1025 via dedicated RRC signaling.

In some aspects, the MB control information 1005/1025 is associated with a group of cells. In this example, the base station 110 may indicate the group of cells, for which the MB control information 1005/1025 is valid, to the UE 120. If the UE 120 performs a cell reselection while in an RRC idle mode, the UE 120 need not enter an RRC connected mode to obtain updated MB control information 1025 if the cell reselected by the UE 120 is in the group of cells, thereby conserving power of the UE 120. However, if the UE 120 selects a cell that is not included in the group of cells, then the UE 120 may enter the RRC connected mode to obtain the MB control information 1005/1025 via dedicated RRC signaling.

Figure 11:
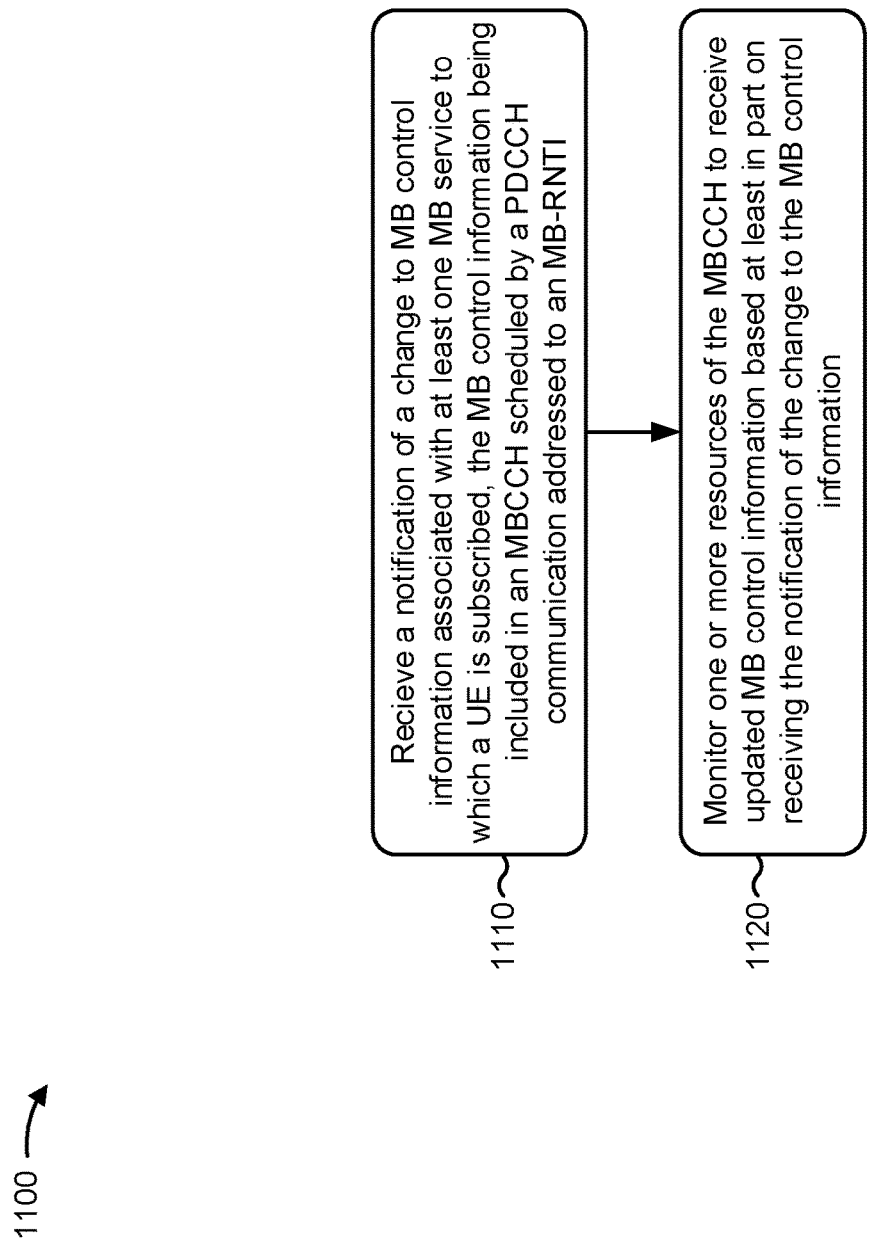
FIGS. 11-13 are flowcharts illustrating example processes performed by a UE in accordance with various aspects of the present disclosure.

FIG. 11 is a flowchart illustrating an example process 1100 performed, for example, by a UE in accordance with various aspects of the present disclosure. The example process 1100 is an example where the UE (for example, UE 120) performs operations associated with monitoring MB control information.

As shown in FIG. 11, in some aspects, the process 1100 may include receiving a notification of a change to MB control information associated with at least one MB service to which the UE is subscribed, the MB control information being included in an MBCCH scheduled by a PDCCH communication addressed to an MB-RNTI (block 1110). For example, the UE (for example, using receive processor 258, controller/processor 280, or memory 282, among other examples) may receive a notification of a change to MB control information associated with at least one MB service to which the UE is subscribed, as described above. In some aspects, the MB control information is included in an MBCCH scheduled by a PDCCH communication addressed to an MB-RNTI.

As further shown in FIG. 11, in some aspects, the process 1100 may include monitoring one or more resources of the MBCCH to receive updated MB control information based at least in part on receiving the notification of the change to the MB control information (block 1120). For example, the UE (for example, using receive processor 258, controller/processor 280, or memory 282, among other examples) may monitor one or more resources of the MBCCH to receive updated MB control information based at least in part on receiving the notification of the change to the MB control information, as described above.

The process 1100 may include additional aspects, such as any single aspect or any combination of aspects described below or in connection with one or more other processes described elsewhere herein.

In a first aspect, the MBCCH is a single MBCCH used to transmit MB control information for all MB services associated with a service area of the UE.

In a second aspect, alone or in combination with the first aspect, the notification is triggered based at least in part on a change to any MB service associated with a service area of the UE.

In a third aspect, alone or in combination with one or more of the first and second aspects, the single MBCCH is associated with multiple sets of MB services and a separate MB control information change notification is associated with each of the multiple sets of MB services.

In a fourth aspect, alone or in combination with one or more of the first through third aspects, the process 1100 includes receiving an MB control information change notification associated with an MB service to which the UE is not subscribed; and refraining from monitoring for updated MB control information based at least in part on receiving the MB control information change notification associated with the MB service to which the UE is not subscribed.

In a fifth aspect, alone or in combination with one or more of the first through fourth aspects, the MBCCH is one of multiple MBCCHs, each of the multiple MBCCHs being associated with a different set of MB services.

In a sixth aspect, alone or in combination with one or more of the first through fifth aspects, a separate MB control information change is associated with each of the multiple MBCCHs.

In a seventh aspect, alone or in combination with one or more of the first through sixth aspects, the process 1100 includes receiving an MB control information change notification associated with an MBCCH that is associated with a set of MB services to which the UE is not subscribed; and refraining from monitoring for updated MB control information based at least in part on receiving the MB control information change notification associated with the MBCCH that is associated with a set of MB services to which the UE is not subscribed.

In an eighth aspect, alone or in combination with one or more of the first through seventh aspects, at least two MBCCHs of the multiple MBCCHs are associated with a same MB-RNTI.

In a ninth aspect, alone or in combination with one or more of the first through eighth aspects, different MBCCHs, of the at least two MBCCHs that are associated with the same MB-RNTI, are associated with different non-overlapping scheduling windows, different hybrid automatic repeat request processes, different logical channel identifiers, or a combination thereof.

In a tenth aspect, alone or in combination with one or more of the first through ninth aspects, at least two MBCCHs of the multiple MBCCHs are associated with different MB-RNTIs.

In an eleventh aspect, alone or in combination with one or more of the first through tenth aspects, at least two MBCCHs of the multiple MBCCHs correspond to different bandwidth part configurations.

In a twelfth aspect, alone or in combination with one or more of the first through eleventh aspects, the process 1100 includes receiving a configuration message that indicates respective sets of MB services corresponding to each of the multiple MBCCHs; and monitoring the MBCCH based at least in part on the configuration message.

In a thirteenth aspect, alone or in combination with one or more of the first through twelfth aspects, the process 1100 includes receiving an indication of a new MB service; and monitoring the one or more resources of the MBCCH to receive the updated MB control information based at least in part on receiving the indication of the new MB service.

In a fourteenth aspect, alone or in combination with one or more of the first through thirteenth aspects, the notification of the change to the MB control information is included in the PDCCH communication addressed to the MB-RNTI.

In a fifteenth aspect, alone or in combination with one or more of the first through fourteenth aspects, the PDCCH communication addressed to the MB-RNTI includes an indication of whether the PDCCH communication includes scheduling information for the MBCCH and not the notification of the change, includes the notification of the change and not the scheduling information, or includes both the scheduling information and the notification of the change.

In a sixteenth aspect, alone or in combination with one or more of the first through fifteenth aspects, the notification of the change includes a bitmap, and different bits of the bitmap correspond to different MBCCHs associated with different sets of MB services or to different sets of MB services in a single MBCCH.

In a seventeenth aspect, alone or in combination with one or more of the first through sixteenth aspects, the bitmap includes a bit to indicate a new MB service.

In an eighteenth aspect, alone or in combination with one or more of the first through seventeenth aspects, the process 1100 includes receiving an indication of one or more resources that carry the notification of the change to the MB control information; and monitoring the one or more resources that carry the notification of the change to the MB control information.

In a nineteenth aspect, alone or in combination with one or more of the first through eighteenth aspects, the notification of the change to the MB control information is received by the UE in a message addressed to a different RNTI than the MB-RNTI to which the PDCCH communication is addressed.

Although FIG. 11 shows example blocks of the process 1100, in some aspects, the process 1100 may include additional blocks, fewer blocks, different blocks, or differently arranged blocks than those depicted in FIG. 11. Additionally or alternatively, two or more of the blocks of the process 1100 may be performed in parallel.

Figure 12:
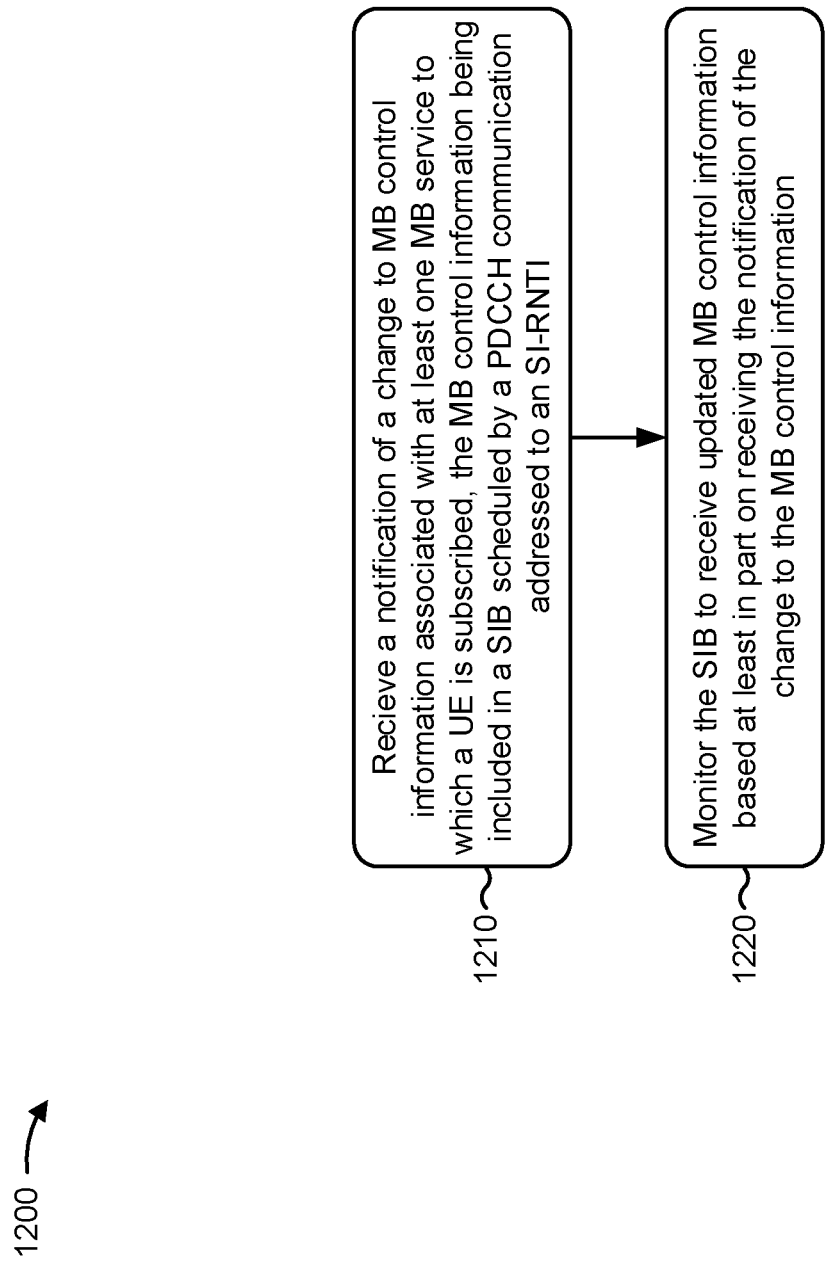

FIG. 12 is a flowchart illustrating an example process 1200 performed, for example, by a UE in accordance with various aspects of the present disclosure. The example process 1200 is an example where the UE (for example, UE 120) performs operations associated with monitoring MB control information.

As shown in FIG. 12, in some aspects, the process 1200 may include receiving a notification of a change to MB control information associated with at least one MB service to which the UE is subscribed, the MB control information being included in a SIB scheduled by a PDCCH communication addressed to an SI-RNTI (block 1210). For example, the UE (for example, using receive processor 258, controller/processor 280, or memory 282, among other examples) may receive a notification of a change to MB control information associated with at least one MB service to which the UE is subscribed, as described above. In some aspects, the MB control information is included in a SIB scheduled by a PDCCH communication addressed to an SI-RNTI.

As further shown in FIG. 12, in some aspects, the process 1200 may include monitoring the SIB to receive updated MB control information based at least in part on receiving the notification of the change to the MB control information (block 1220). For example, the UE (for example, using receive processor 258, controller/processor 280, or memory 282, among other examples) may monitor the SIB to receive updated MB control information based at least in part on receiving the notification of the change to the MB control information, as described above.

The process 1200 may include additional aspects, such as any single aspect or any combination of aspects described below or in connection with one or more other processes described elsewhere herein.

In a first aspect, the notification of the change to the MB control information is included in a PDCCH communication addressed to a P-RNTI.

In a second aspect, alone or in combination with the first aspect, the PDCCH communication addressed to the P-RNTI includes at least one of an indication of whether there is a modification to system information other than a set of SIBs that includes the SIB carrying the MB control information, an indication of whether there is a modification to the SIB carrying the MB control information, or a combination thereof.

In a third aspect, alone or in combination with one or more of the first and second aspects, the process 1200 includes monitoring the SIB to receive the updated MB control information based at least in part on a value of a bit, in the PDCCH communication addressed to the P-RNTI, that indicates whether there is a modification to the SIB.

In a fourth aspect, alone or in combination with one or more of the first through third aspects, the PDCCH communication addressed to the P-RNTI includes at least one of an indication of whether there is a modification to a specific set of MB services, an indication of a new MB service, or a combination thereof.

In a fifth aspect, alone or in combination with one or more of the first through fourth aspects, the PDCCH communication addressed to the P-RNTI includes an indication of whether there is a modification to the SIB, and a paging message corresponding to the PDCCH communication indicates a specific set of MB services associated with the notification of the change to the MB control information.

In a sixth aspect, alone or in combination with one or more of the first through fifth aspects, the notification of the change to the MB control information is included in a PDCCH communication addressed to an RNTI other than a paging RNTI and the SI-RNTI.

In a seventh aspect, alone or in combination with one or more of the first through sixth aspects, the PDCCH communication addressed to the RNTI other than the paging RNTI and the SI-RNTI includes at least one of: multiple bits, wherein different bits indicate a change to MB control information for different sets of MB services, an indication of a new MB service, or a combination thereof.

In an eighth aspect, alone or in combination with one or more of the first through seventh aspects, a PDCCH communication addressed to a paging RNTI includes an indication of whether there is a modification to system information other than a set of SIBs that includes the SIB that carries the MB control information.

Although FIG. 12 shows example blocks of the process 1200, in some aspects, the process 1200 may include additional blocks, fewer blocks, different blocks, or differently arranged blocks than those depicted in FIG. 12. Additionally or alternatively, two or more of the blocks of the process 1200 may be performed in parallel.

Figure 13:
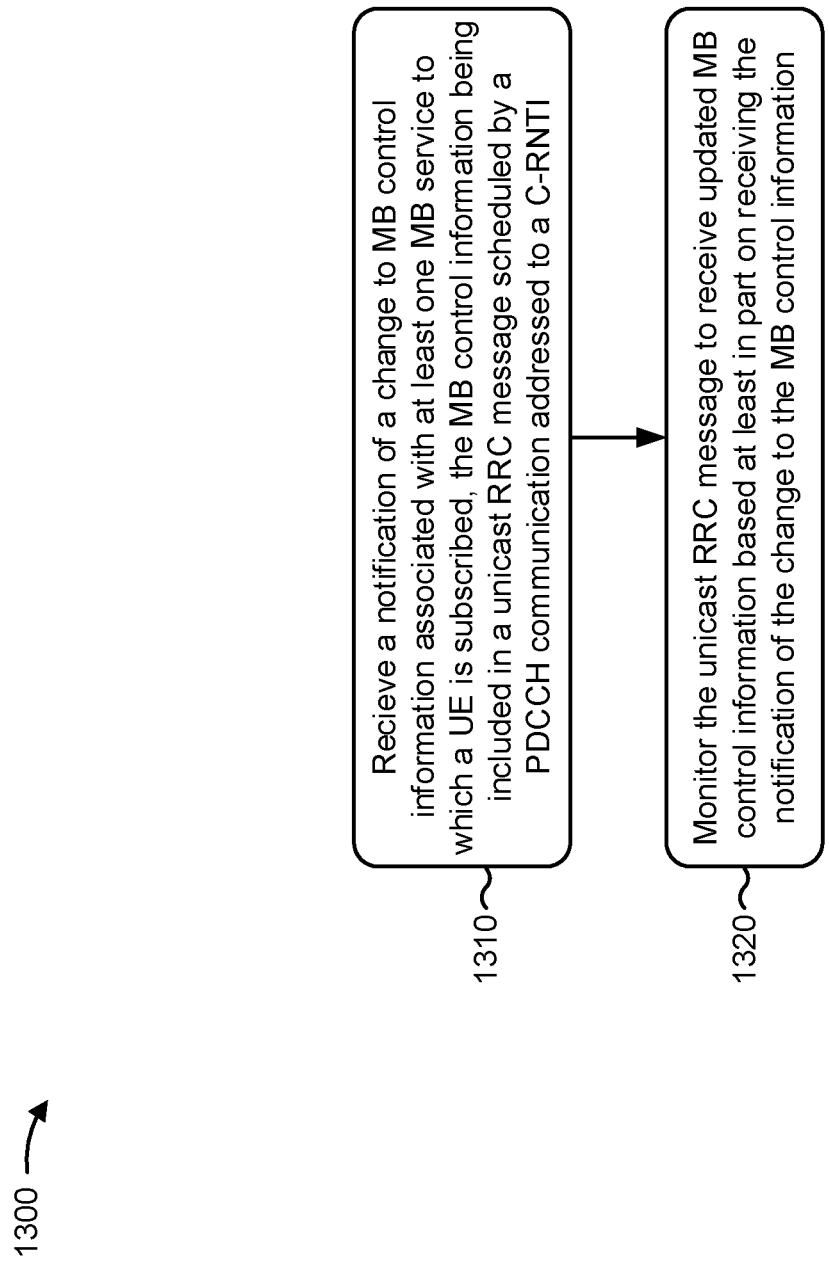

FIG. 13 is a flowchart illustrating an example process 1300 performed, for example, by a UE in accordance with various aspects of the present disclosure. The example process 1300 is an example where the UE (for example, UE 120) performs operations associated with monitoring MB control information.

As shown in FIG. 13, in some aspects, the process 1300 may include receiving a notification of a change to MB control information associated with at least one MB service to which the UE is subscribed, the MB control information being included in a unicast RRC message scheduled by a PDCCH communication addressed to a C-RNTI (block 1310). For example, the UE (for example, using receive processor 258, controller/processor 280, or memory 282, among other examples) may receive a notification of a change to MB control information associated with at least one MB service to which the UE is subscribed, as described above. In some aspects, the MB control information is included in a unicast RRC message scheduled by a PDCCH communication addressed to a C-RNTI.

As further shown in FIG. 13, in some aspects, the process 1300 may include monitoring the unicast RRC message to receive updated MB control information based at least in part on receiving the notification of the change to the MB control information (block 1320). For example, the UE (for example, using receive processor 258, controller/processor 280, or memory 282, among other examples) may monitor the unicast RRC message to receive updated MB control information based at least in part on receiving the notification of the change to the MB control information, as described above.

The process 1300 may include additional aspects, such as any single aspect or any combination of aspects described below or in connection with one or more other processes described elsewhere herein.

In a first aspect, the notification of the change is indicated in at least one of: dedicated RRC signaling, a paging message, a short message indication, or a combination thereof.

In a second aspect, alone or in combination with the first aspect, the MB control information includes an indication of a group of cells in which the MB control information is valid.

Although FIG. 13 shows example blocks of the process 1300, in some aspects, the process 1300 may include additional blocks, fewer blocks, different blocks, or differently arranged blocks than those depicted in FIG. 13. Additionally or alternatively, two or more of the blocks of the process 1300 may be performed in parallel.

Figure 14:
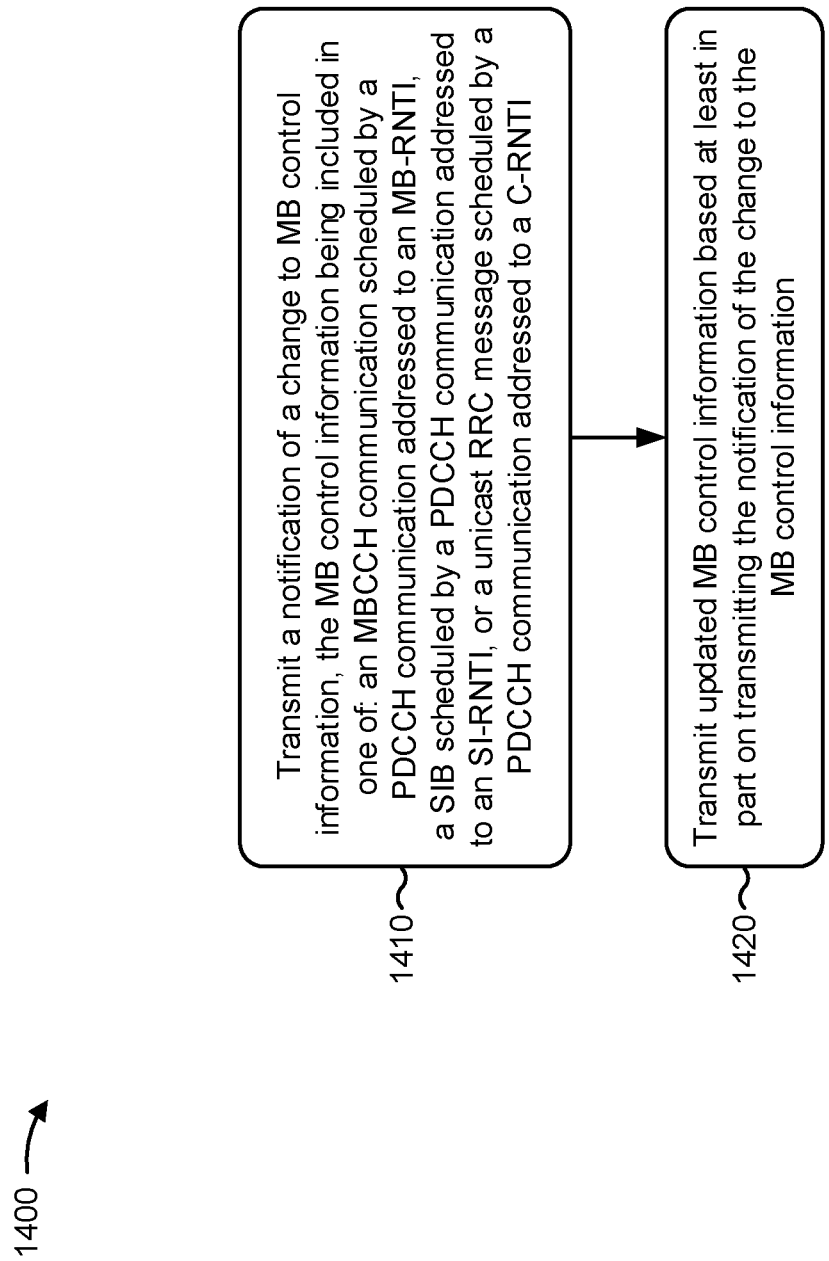
FIG. 14 is a flowchart illustrating an example process performed by a base station in accordance with various aspects of the present disclosure.

FIG. 14 is a flowchart illustrating an example process 1400 performed, for example, by a base station in accordance with various aspects of the present disclosure. The example process 1400 is an example where the base station (for example, base station 110) performs operations associated with monitoring MB control information.

As shown in FIG. 14, in some aspects, the process 1400 may include transmitting a notification of a change to MB control information, the MB control information being included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier (block 1410). For example, the base station (for example, using transmit processor 220, controller/processor 240, or memory 242, among other examples) may transmit a notification of a change to MB control information, as described above. In some aspects, the MB control information is included in one of: an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier.

As further shown in FIG. 14, in some aspects, the process 1400 may include transmitting updated MB control information based at least in part on transmitting the notification of the change to the MB control information (block 1420). For example, the base station (for example, using transmit processor 220, controller/processor 240, or memory 242, among other examples) may transmit updated MB control information based at least in part on transmitting the notification of the change to the MB control information, as described above.

The process 1400 may include additional aspects, such as any single aspect or any combination of aspects described in connection with one or more other processes described elsewhere herein.

Although FIG. 14 shows example blocks of the process 1400, in some aspects, the process 1400 may include additional blocks, fewer blocks, different blocks, or differently arranged blocks than those depicted in FIG. 14. Additionally or alternatively, two or more of the blocks of the process 1400 may be performed in parallel.

Figure 15:
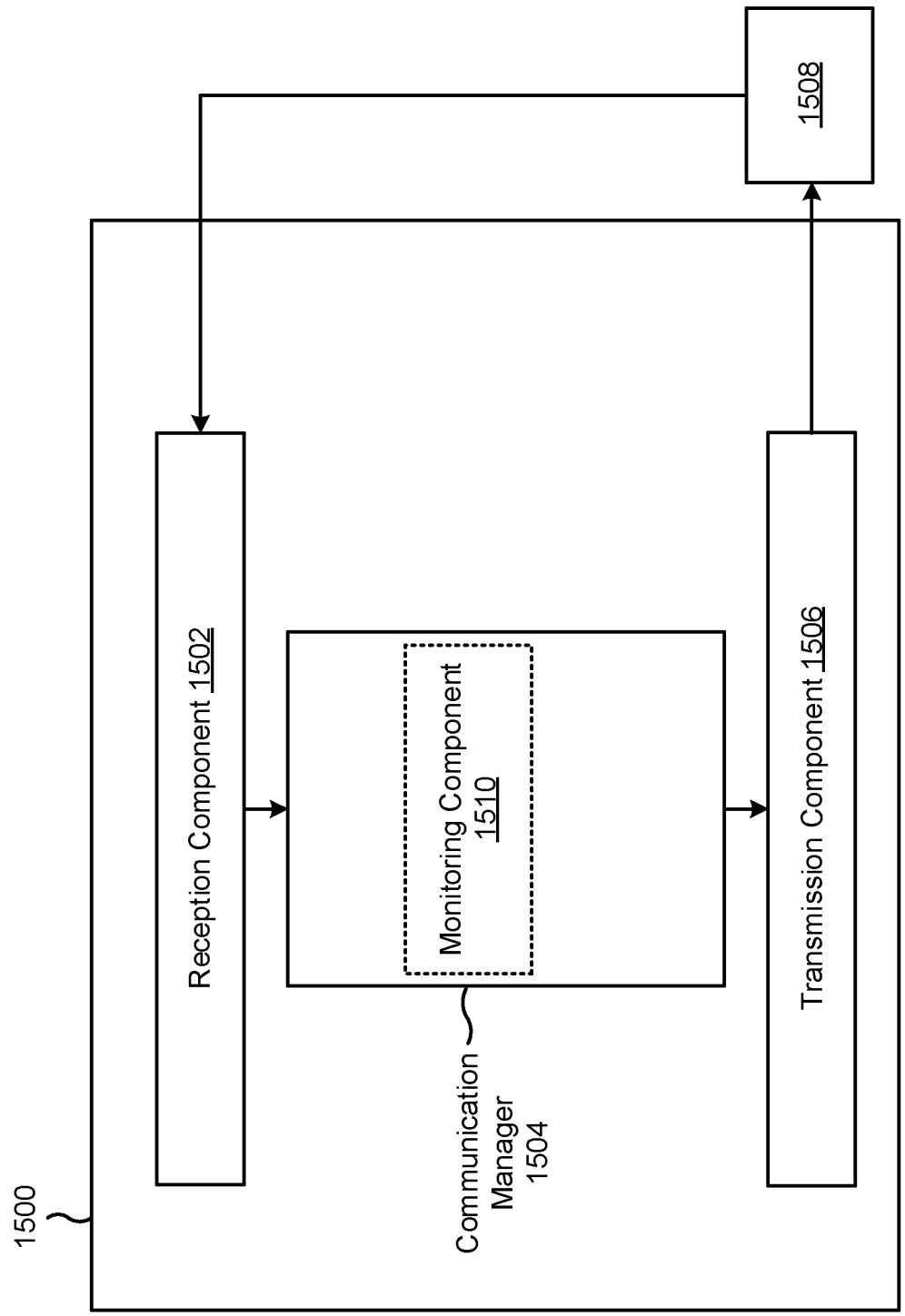
FIGS. 15-18 are block diagrams of example apparatuses for wireless communication in accordance with various aspects of the present disclosure.

FIG. 15 is a block diagram of an example apparatus 1500 for wireless communication in accordance with various aspects of the present disclosure. The apparatus 1500 may be a UE, or a UE may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as a UE, a base station, or another wireless communication device) using the reception component 1502 and the transmission component 1506.

In some aspects, the apparatus 1500 may be configured to perform one or more operations described herein in connection with FIGS. 4-10. Additionally or alternatively, the apparatus 1500 may be configured to perform one or more processes described herein, such as process 1100 of FIG. 11, process 1200 of FIG. 12, process 1300 of FIG. 13, or a combination thereof. In some aspects, the apparatus 1500 may include one or more components of the UE described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the UE described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the UE described above in connection with FIG. 2. In some aspects, the transmission component 1506 may be co-located with the reception component 1502 in a transceiver.

The communication manager 1504 may receive or may cause the reception component 1502 to receive a notification of a change to MB control information associated with at least one MB service to which the UE is subscribed, the MB control information being included in an MBCCH scheduled by a PDCCH communication addressed to an MB-RNTI. The communication manager 1504 may monitor one or more resources of the MBCCH to receive updated MB control information based at least in part on receiving the notification of the change to the MB control information. In some aspects, the communication manager 1504 may perform one or more operations described elsewhere herein as being performed by one or more components of the communication manager 1504.

The communication manager 1504 may include a controller/processor, a memory, or a combination thereof, of the UE described above in connection with FIG. 2. In some aspects, the communication manager 1504 includes a set of components, such as a monitoring component 1510. Alternatively, the set of components may be separate and distinct from the communication manager 1504. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive a notification of a change to MB control information associated with at least one MB service to which the UE is subscribed, the MB control information being included in an MBCCH scheduled by a PDCCH communication addressed to an MB-RNTI. The reception component 1502 and/or the monitoring component 1510 may monitor one or more resources of the MBCCH to receive updated MB control information based at least in part on receiving the notification of the change to the MB control information.

The reception component 1502 may receive an MB control information change notification associated with an MB service to which the UE is not subscribed. The reception component 1502 and/or the monitoring component 1510 may refrain from monitoring for updated MB control information based at least in part on receiving the MB control information change notification associated with the MB service to which the UE is not subscribed.

The reception component 1502 may receive an MB control information change notification associated with an MBCCH that is associated with a set of MB services to which the UE is not subscribed. The reception component 1502 and/or the monitoring component 1510 may refrain from monitoring for updated MB control information based at least in part on receiving the MB control information change notification associated with the MBCCH that is associated with a set of MB services to which the UE is not subscribed.

The reception component 1502 may receive a configuration message that indicates respective sets of MB services corresponding to each of the multiple MBCCHs. The reception component 1502 and/or the monitoring component 1510 may monitor the MBCCH based at least in part on the configuration message.

The reception component 1502 may receive an indication of a new MB service. The reception component 1502 and/or the monitoring component 1510 may monitor the one or more resources of the MBCCH to receive the updated MB control information based at least in part on receiving the indication of the new MB service.

The reception component 1502 may receive an indication of one or more resources that carry the notification of the change to the MB control information. The reception component 1502 and/or the monitoring component 1510 may monitor the one or more resources that carry the notification of the change to the MB control information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
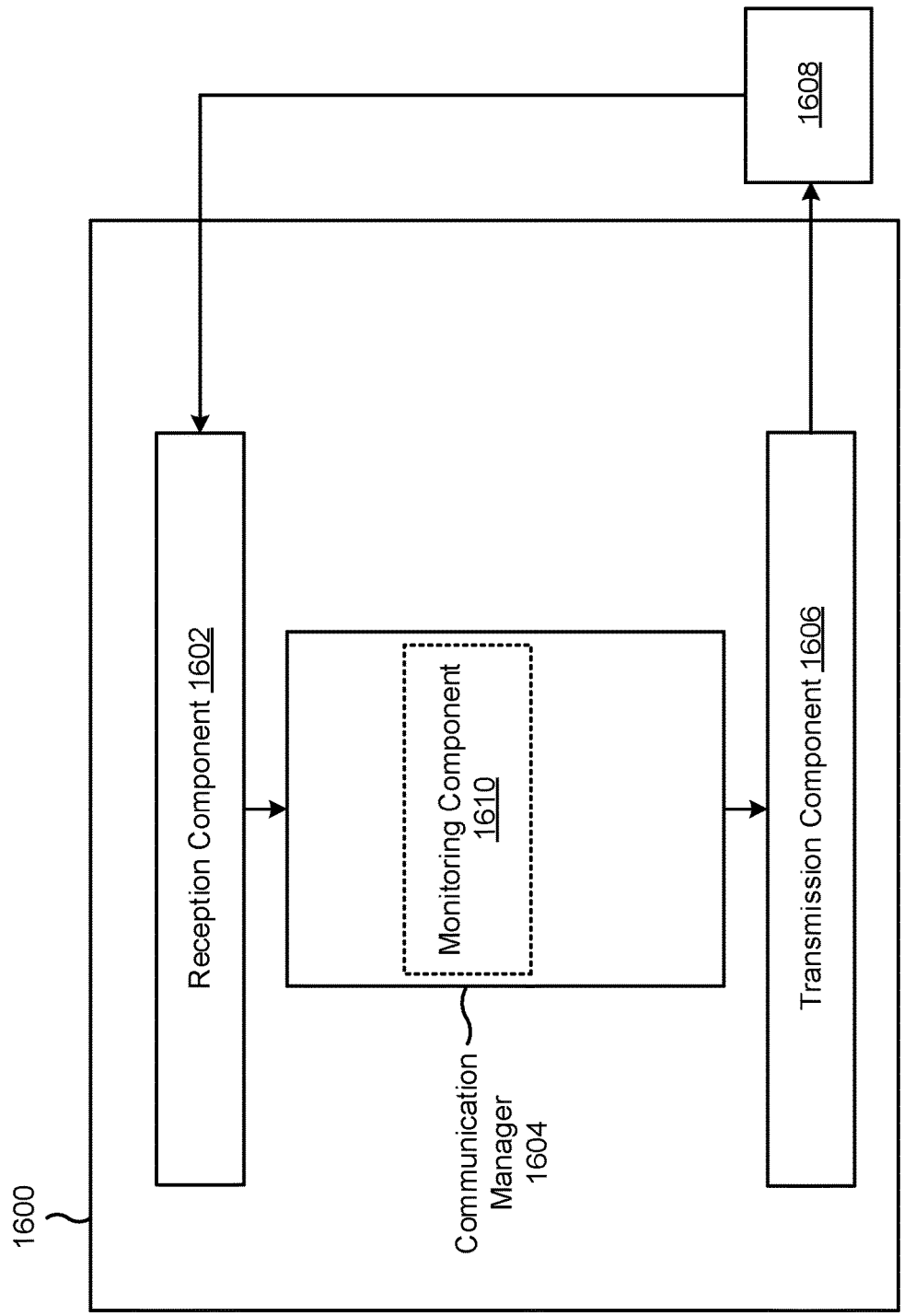

FIG. 16 is a block diagram of an example apparatus 1600 for wireless communication in accordance with various aspects of the present disclosure. The apparatus 1600 may be a UE, or a UE may include the apparatus 1600. In some aspects, the apparatus 1600 includes a reception component 1602, a communication manager 1604, and a transmission component 1606, which may be in communication with one another (for example, via one or more buses). As shown, the apparatus 1600 may communicate with another apparatus 1608 (such as a UE, a base station, or another wireless communication device) using the reception component 1602 and the transmission component 1606.

In some aspects, the apparatus 1600 may be configured to perform one or more operations described herein in connection with FIGS. 4-10. Additionally or alternatively, the apparatus 1600 may be configured to perform one or more processes described herein, such as process 1100 of FIG. 11, process 1200 of FIG. 12, process 1300 of FIG. 13, or a combination thereof. In some aspects, the apparatus 1600 may include one or more components of the UE described above in connection with FIG. 2.

The reception component 1602 may receive communications, such as reference signals, control information, data communications, or a combination thereof, from the apparatus 1608. The reception component 1602 may provide received communications to one or more other components of the apparatus 1600, such as the communication manager 1604. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a demodulator, a MIMO detector, a receive processor, a controller/processor, a memory, or a combination thereof, of the UE described above in connection with FIG. 2.

The transmission component 1606 may transmit communications, such as reference signals, control information, data communications, or a combination thereof, to the apparatus 1608. In some aspects, the communication manager 1604 may generate communications and may transmit the generated communications to the transmission component 1606 for transmission to the apparatus 1608. In some aspects, the transmission component 1606 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1606 may include one or more antennas, a modulator, a transmit MIMO processor, a transmit processor, a controller/processor, a memory, or a combination thereof, of the UE described above in connection with FIG. 2. In some aspects, the transmission component 1606 may be co-located with the reception component 1602 in a transceiver.

The communication manager 1604 may receive or may cause the reception component 1602 to receive a notification of a change to MB control information associated with at least one MB service to which the UE is subscribed, the MB control information being included in a SIB scheduled by a PDCCH communication addressed to an SI-RNTI. The communication manager 1604 may monitor the SIB to receive updated MB control information based at least in part on receiving the notification of the change to the MB control information. In some aspects, the communication manager 1604 may perform one or more operations described elsewhere herein as being performed by one or more components of the communication manager 1604.

The communication manager 1604 may include a controller/processor, a memory, or a combination thereof, of the UE described above in connection with FIG. 2. In some aspects, the communication manager 1604 includes a set of components, such as a monitoring component 1610. Alternatively, the set of components may be separate and distinct from the communication manager 1604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive a notification of a change to MB control information associated with at least one MB service to which the UE is subscribed, the MB control information being included in a SIB scheduled by a PDCCH communication addressed to an SI-RNTI. The reception component 1602 and/or the monitoring component 1610 may monitor the SIB to receive updated MB control information based at least in part on receiving the notification of the change to the MB control information.

The reception component 1602 and/or the monitoring component 1610 may monitor the SIB to receive the updated MB control information based at least in part on a value of a bit, in the PDCCH communication addressed to the P-RNTI, that indicates whether there is a modification to the SIB.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
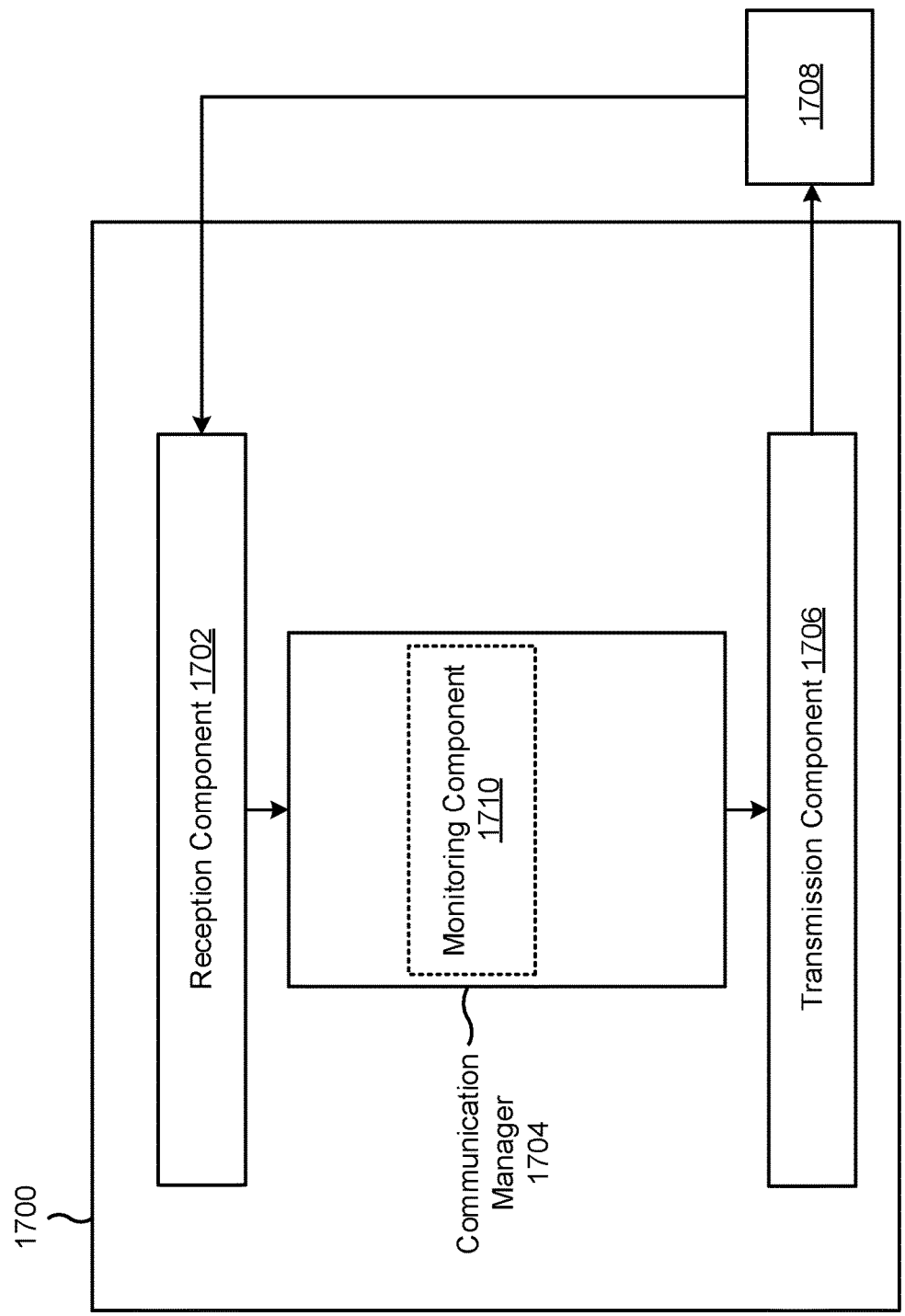

FIG. 17 is a block diagram of an example apparatus 1700 for wireless communication in accordance with various aspects of the present disclosure. The apparatus 1700 may be a UE, or a UE may include the apparatus 1700. In some aspects, the apparatus 1700 includes a reception component 1702, a communication manager 1704, and a transmission component 1706, which may be in communication with one another (for example, via one or more buses). As shown, the apparatus 1700 may communicate with another apparatus 1708 (such as a UE, a base station, or another wireless communication device) using the reception component 1702 and the transmission component 1706.

In some aspects, the apparatus 1700 may be configured to perform one or more operations described herein in connection with FIGS. 4-10. Additionally or alternatively, the apparatus 1700 may be configured to perform one or more processes described herein, such as process 1100 of FIG. 11, process 1200 of FIG. 12, process 1300 of FIG. 13, or a combination thereof. In some aspects, the apparatus 1700 may include one or more components of the UE described above in connection with FIG. 2.

The reception component 1702 may receive communications, such as reference signals, control information, data communications, or a combination thereof, from the apparatus 1708. The reception component 1702 may provide received communications to one or more other components of the apparatus 1700, such as the communication manager 1704. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, a demodulator, a MIMO detector, a receive processor, a controller/processor, a memory, or a combination thereof, of the UE described above in connection with FIG. 2.

The transmission component 1706 may transmit communications, such as reference signals, control information, data communications, or a combination thereof, to the apparatus 1708. In some aspects, the communication manager 1704 may generate communications and may transmit the generated communications to the transmission component 1706 for transmission to the apparatus 1708. In some aspects, the transmission component 1706 may perform signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1706 may include one or more antennas, a modulator, a transmit MIMO processor, a transmit processor, a controller/processor, a memory, or a combination thereof, of the UE described above in connection with FIG. 2. In some aspects, the transmission component 1706 may be co-located with the reception component 1702 in a transceiver.

The communication manager 1704 may receive or may cause the reception component 1702 to receive a notification of a change to MB control information associated with at least one MB service to which the UE is subscribed, the MB control information being included in a unicast RRC message scheduled by a PDCCH communication addressed to a C-RNTI. The communication manager 1704 may monitor the unicast RRC message to receive updated MB control information based at least in part on receiving the notification of the change to the MB control information. In some aspects, the communication manager 1704 may perform one or more operations described elsewhere herein as being performed by one or more components of the communication manager 1704.

The communication manager 1704 may include a controller/processor, a memory, or a combination thereof, of the UE described above in connection with FIG. 2. In some aspects, the communication manager 1704 includes a set of components, such as a monitoring component 1710. Alternatively, the set of components may be separate and distinct from the communication manager 1704. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive a notification of a change to MB control information associated with at least one MB service to which the UE is subscribed, the MB control information being included in a unicast RRC message scheduled by a PDCCH communication addressed to a C-RNTI. The reception component 1702 and/or the monitoring component 1710 may monitor the unicast RRC message to receive updated MB control information based at least in part on receiving the notification of the change to the MB control information.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
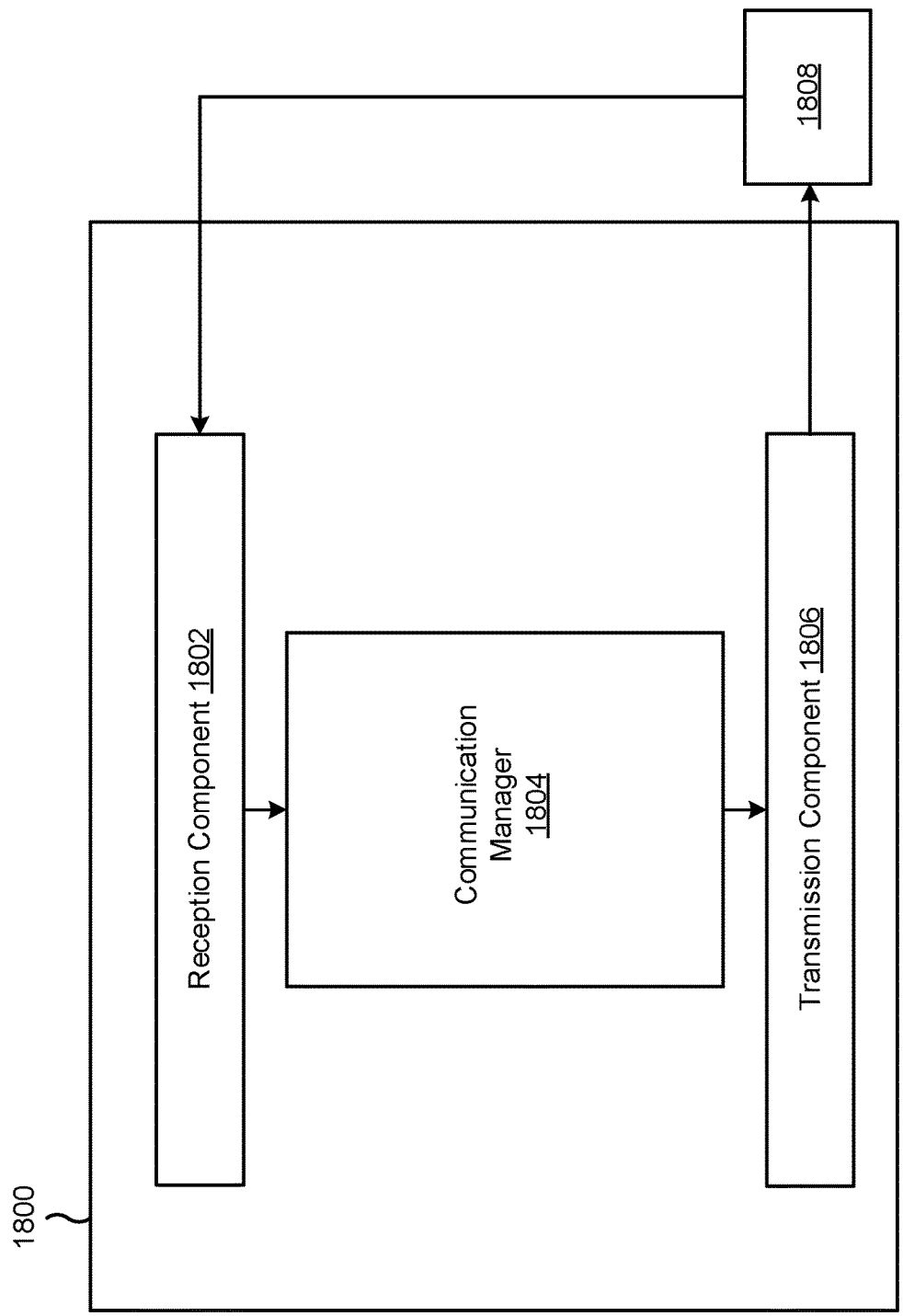

FIG. 18 is a block diagram of an example apparatus 1800 for wireless communication in accordance with various aspects of the present disclosure. The apparatus 1800 may be a base station, or a base station may include the apparatus 1800. In some aspects, the apparatus 1800 includes a reception component 1802, a communication manager 1804, and a transmission component 1806, which may be in communication with one another (for example, via one or more buses). As shown, the apparatus 1800 may communicate with another apparatus 1808 (such as a UE, a base station, or another wireless communication device) using the reception component 1802 and the transmission component 1806.

In some aspects, the apparatus 1800 may be configured to perform one or more operations described herein in connection with FIGS. 4-10. Additionally or alternatively, the apparatus 1800 may be configured to perform one or more processes described herein, such as process 1400 of FIG. 14. In some aspects, the apparatus 1800 may include one or more components of the base station described above in connection with FIG. 2.

The reception component 1802 may receive communications, such as reference signals, control information, data communications, or a combination thereof, from the apparatus 1808. The reception component 1802 may provide received communications to one or more other components of the apparatus 1800, such as the communication manager 1804. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1802 may include one or more antennas, a demodulator, a MIMO detector, a receive processor, a controller/processor, a memory, or a combination thereof, of the base station described above in connection with FIG. 2.

The transmission component 1806 may transmit communications, such as reference signals, control information, data communications, or a combination thereof, to the apparatus 1808. In some aspects, the communication manager 1804 may generate communications and may transmit the generated communications to the transmission component 1806 for transmission to the apparatus 1808. In some aspects, the transmission component 1806 may perform signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1806 may include one or more antennas, a modulator, a transmit MIMO processor, a transmit processor, a controller/processor, a memory, or a combination thereof, of the base station described above in connection with FIG. 2. In some aspects, the transmission component 1806 may be co-located with the reception component 1802 in a transceiver.

The communication manager 1804 may transmit or may cause the transmission component 1806 to transmit a notification of a change to MB control information, the MB control information being included in one of an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier. The communication manager 1804 may transmit or may cause the transmission component 1806 to transmit updated MB control information based at least in part on transmitting the notification of the change to the MB control information. In some aspects, the communication manager 1804 may perform one or more operations described elsewhere herein as being performed by one or more components of the communication manager 1804.

The communication manager 1804 may include a controller/processor, a memory, a scheduler, a communication unit, or a combination thereof, of the base station described above in connection with FIG. 2. In some aspects, the communication manager 1804 includes a set of components. Alternatively, the set of components may be separate and distinct from the communication manager 1804. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1806 may transmit a notification of a change to MB control information, the MB control information being included in one of an MB control channel communication scheduled by a PDCCH communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier. The transmission component 1806 may transmit updated MB control information based at least in part on transmitting the notification of the change to the MB control information.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

The following provides an overview of aspects of the present disclosure:

Aspect 1: A method of wireless communication performed by a user equipment (UE), comprising: receiving a notification of a change to multicast broadcast (MB) control information associated with at least one MB service to which the UE is subscribed, the MB control information being included in an MB control channel (MBCCH) scheduled by a physical downlink control channel (PDCCH) communication addressed to an MB radio network temporary identifier (MB-RNTI); and monitoring one or more resources of the MBCCH to receive updated MB control information based at least in part on receiving the notification of the change to the MB control information.

Aspect 2: The method of aspect 1, wherein the MBCCH is a single MBCCH used to transmit MB control information for all MB services associated with a service area of the UE.

Aspect 3: The method of aspect 2, wherein the notification is triggered based at least in part on a change to any MB service associated with a service area of the UE.

Aspect 4: The method of aspect 2, wherein the single MBCCH is associated with multiple sets of MB services and a separate MB control information change notification is associated with each of the multiple sets of MB services.

Aspect 5: The method of aspect 4, further comprising: receiving an MB control information change notification associated with an MB service to which the UE is not subscribed; and refraining from monitoring for updated MB control information based at least in part on receiving the MB control information change notification associated with the MB service to which the UE is not subscribed.

Aspect 6: The method of aspect 1, wherein the MBCCH is one of multiple MBCCHs, each of the multiple MBCCHs being associated with a different set of MB services.

Aspect 7: The method of aspect 6, wherein a separate MB control information change is associated with each of the multiple MBCCHs.

Aspect 8: The method of aspect 7, further comprising: receiving an MB control information change notification associated with an MBCCH that is associated with a set of MB services to which the UE is not subscribed; and refraining from monitoring for updated MB control information based at least in part on receiving the MB control information change notification associated with the MBCCH that is associated with a set of MB services to which the UE is not subscribed.

Aspect 9: The method of aspect 6, wherein at least two MBCCHs of the multiple MBCCHs are associated with a same MB-RNTI.

Aspect 10: The method of aspect 9, wherein different MBCCHs, of the at least two MBCCHs that are associated with the same MB-RNTI, are associated with different non-overlapping scheduling windows, different hybrid automatic repeat request processes, different logical channel identifiers, or a combination thereof.

Aspect 11: The method of aspect 6, wherein at least two MBCCHs of the multiple MBCCHs are associated with different MB-RNTIs.

Aspect 12: The method of aspect 6, wherein at least two MBCCHs of the multiple MBCCHs correspond to different bandwidth part configurations.

Aspect 13: The method of aspect 6, further comprising: receiving a configuration message that indicates respective sets of MB services corresponding to each of the multiple MBCCHs; and monitoring the MBCCH based at least in part on the configuration message.

Aspect 14: The method of any of the preceding aspects, further comprising: receiving an indication of a new MB service; and monitoring the one or more resources of the MBCCH to receive the updated MB control information based at least in part on receiving the indication of the new MB service.

Aspect 15: The method of any of the preceding aspects, wherein the notification of the change to the MB control information is included in the PDCCH communication addressed to the MB-RNTI.

Aspect 16: The method of aspect 15, wherein the PDCCH communication addressed to the MB-RNTI includes an indication of whether the PDCCH communication includes scheduling information for the MBCCH and not the notification of the change, includes the notification of the change and not the scheduling information, or includes both the scheduling information and the notification of the change.

Aspect 17: The method of any one of aspects 15-16, wherein the notification of the change includes a bitmap, and wherein different bits of the bitmap correspond to different MBCCHs associated with different sets of MB services or to different sets of MB services in a single MBCCH.

Aspect 18: The method of aspect 17, wherein the bitmap includes a bit to indicate a new MB service.

Aspect 19: The method of any one of the preceding aspects, further comprising: receiving an indication of one or more resources that carry the notification of the change to the MB control information; and monitoring the one or more resources that carry the notification of the change to the MB control information.

Aspect 20: The method of any one of the preceding aspects, wherein the notification of the change to the MB control information is received by the UE in a message addressed to a different RNTI than the MB-RNTI to which the PDCCH communication is addressed.

Aspect 21: A method of wireless communication performed by a user equipment (UE), comprising: receiving a notification of a change to multicast broadcast (MB) control information associated with at least one MB service to which the UE is subscribed, the MB control information being included in a system information block (SIB) scheduled by a physical downlink control channel (PDCCH) communication addressed to a system information radio network temporary identifier (SI-RNTI); and monitoring the SIB to receive updated MB control information based at least in part on receiving the notification of the change to the MB control information.

Aspect 22: The method of aspect 21, wherein the notification of the change to the MB control information is included in a PDCCH communication addressed to a paging RNTI (P-RNTI).

Aspect 23: The method of aspect 22, wherein the PDCCH communication addressed to the P-RNTI includes at least one of an indication of whether there is a modification to system information other than a set of SIBs that includes the SIB carrying the MB control information, an indication of whether there is a modification to the SIB carrying the MB control information, or a combination thereof.

Aspect 24: The method of any one of aspects 22-23, further comprising monitoring the SIB to receive the updated MB control information based at least in part on a value of a bit, in the PDCCH communication addressed to the P-RNTI, that indicates whether there is a modification to the SIB.

Aspect 25: The method of any one of aspects 22-24, wherein the PDCCH communication addressed to the P-RNTI includes at least one of an indication of whether there is a modification to a specific set of MB services, an indication of a new MB service, or a combination thereof.

Aspect 26: The method of any one of aspects 22-25, wherein the PDCCH communication addressed to the P-RNTI includes an indication of whether there is a modification to the SIB, and wherein a paging message corresponding to the PDCCH communication indicates a specific set of MB services associated with the notification of the change to the MB control information.

Aspect 27: The method of any one of aspects 21-26, wherein the notification of the change to the MB control information is included in a PDCCH communication addressed to an RNTI other than a paging RNTI and the SI-RNTI.

Aspect 28: The method of aspect 27, wherein the PDCCH communication addressed to the RNTI other than the paging RNTI and the SI-RNTI includes at least one of: multiple bits, wherein different bits indicate a change to MB control information for different sets of MB services, an indication of a new MB service, or a combination thereof.

Aspect 29: The method of aspect 27, wherein a PDCCH communication addressed to a paging RNTI includes an indication of whether there is a modification to system information other than a set of SIBs that includes the SIB that carries the MB control information.

Aspect 30: A method of wireless communication performed by a user equipment (UE), comprising: receiving a notification of a change to multicast broadcast (MB) control information associated with at least one MB service to which the UE is subscribed, the MB control information being included in a unicast radio resource control (RRC) message scheduled by a physical downlink control channel (PDCCH) communication addressed to a cell radio network temporary identifier (C-RNTI); and monitoring the unicast RRC message to receive updated MB control information based at least in part on receiving the notification of the change to the MB control information.

Aspect 31: The method of aspect 30, wherein the notification of the change is indicated in at least one of: dedicated RRC signaling, a paging message, a short message indication, or a combination thereof.

Aspect 32: The method of any one of aspects 30-31, wherein the MB control information includes an indication of a group of cells in which the MB control information is valid.

Aspect 33: A method of wireless communication performed by a base station, comprising: transmitting a notification of a change to multicast broadcast (MB) control information, the MB control information being included in one of: an MB control channel communication scheduled by a physical downlink control channel (PDCCH) communication addressed to an MB radio network temporary identifier, a system information block scheduled by a PDCCH communication addressed to a system information radio network temporary identifier, or a unicast radio resource control message scheduled by a PDCCH communication addressed to a cell radio network temporary identifier; and transmitting updated MB control information based at least in part on transmitting the notification of the change to the MB control information.

Aspect 34: An apparatus for wireless communication at a device, comprising a processor; memory coupled with the processor; and instructions stored in the memory and executable by the processor to cause the apparatus to perform the method of one or more aspects of aspects 1-20.

Aspect 35: A device for wireless communication, comprising a memory and one or more processors coupled to the memory, the memory and the one or more processors configured to perform the method of one or more aspects of aspects 1-20.

Aspect 36: An apparatus for wireless communication, comprising at least one means for performing the method of one or more aspects of aspects 1-20.

Aspect 37: A non-transitory computer-readable medium storing code for wireless communication, the code comprising instructions executable by a processor to perform the method of one or more aspects of aspects 1-20.

Aspect 38: A non-transitory computer-readable medium storing a set of instructions for wireless communication, the set of instructions comprising one or more instructions that, when executed by one or more processors of a device, cause the device to perform the method of one or more aspects of aspects 1-20.

Aspect 39: An apparatus for wireless communication at a device, comprising a processor; memory coupled with the processor; and instructions stored in the memory and executable by the processor to cause the apparatus to perform the method of one or more aspects of aspects 21-29.

Aspect 40: A device for wireless communication, comprising a memory and one or more processors coupled to the memory, the memory and the one or more processors configured to perform the method of one or more aspects of aspects 21-29.

Aspect 41: An apparatus for wireless communication, comprising at least one means for performing the method of one or more aspects of aspects 21-29.

Aspect 42: A non-transitory computer-readable medium storing code for wireless communication, the code comprising instructions executable by a processor to perform the method of one or more aspects of aspects 21-29.

Aspect 43: A non-transitory computer-readable medium storing a set of instructions for wireless communication, the set of instructions comprising one or more instructions that, when executed by one or more processors of a device, cause the device to perform the method of one or more aspects of aspects 21-29.

Aspect 44: An apparatus for wireless communication at a device, comprising a processor; memory coupled with the processor; and instructions stored in the memory and executable by the processor to cause the apparatus to perform the method of one or more aspects of aspects 30-32.

Aspect 45: A device for wireless communication, comprising a memory and one or more processors coupled to the memory, the memory and the one or more processors configured to perform the method of one or more aspects of aspects 30-32.

Aspect 46: An apparatus for wireless communication, comprising at least one means for performing the method of one or more aspects of aspects 30-32.

Aspect 47: A non-transitory computer-readable medium storing code for wireless communication, the code comprising instructions executable by a processor to perform the method of one or more aspects of aspects 30-32.

Aspect 48: A non-transitory computer-readable medium storing a set of instructions for wireless communication, the set of instructions comprising one or more instructions that, when executed by one or more processors of a device, cause the device to perform the method of one or more aspects of aspects 30-32.

Aspect 49: An apparatus for wireless communication at a device, comprising a processor; memory coupled with the processor; and instructions stored in the memory and executable by the processor to cause the apparatus to perform the method of aspect 33.

Aspect 50: A device for wireless communication, comprising a memory and one or more processors coupled to the memory, the memory and the one or more processors configured to perform the method of aspect 33.

Aspect 51: An apparatus for wireless communication, comprising at least one means for performing the method of aspect 33.

Aspect 52: A non-transitory computer-readable medium storing code for wireless communication, the code comprising instructions executable by a processor to perform the method of aspect 33.

Aspect 53: A non-transitory computer-readable medium storing a set of instructions for wireless communication, the set of instructions comprising one or more instructions that, when executed by one or more processors of a device, cause the device to perform the method of aspect 33.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," or "having," or similar terms are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, the one or more processors configured to:
      receive a physical downlink control channel (PDCCH) communication, addressed to a multicast broadcast (MB) radio network temporary identifier (MB-RNTI), that includes a notification of a change to MB control information associated with at least one MB service to which the UE is subscribed, the notification of the change including a bitmap, bits of the bitmap corresponding to one of respective MB control channels (MBCCHs) associated with respective MB services, or MB services associated with a single MBCCH; and
      monitor one or more resources of an MBCCH scheduled by the PDCCH to receive updated MB control information based at least in part on receiving the notification of the change to the MB control information.

2. The UE of claim 1, wherein the MBCCH is the single MBCCH and is used to transmit MB control information for all MB services associated with a service area of the UE.

3. The UE of claim 2, wherein the notification is triggered based at least in part on a change to any MB service associated with a service area of the UE.

4. The UE of claim 2, wherein the single MBCCH is associated with multiple sets of MB services and a separate MB control information change notification is associated with each of the multiple sets of MB services.

5. The UE of claim 4, wherein the one or more processors are further configured to:
   receive an MB control information change notification associated with an MB service to which the UE is not subscribed; and
   refrain from monitoring for updated MB control information based at least in part on receiving the MB control information change notification associated with the MB service to which the UE is not subscribed.

6. The UE of claim 1, wherein the MBCCH is one of multiple MBCCHs, each of the multiple MBCCHs being associated with a different set of MB services.

7. The UE of claim 6, wherein a separate MB control information change is associated with each of the multiple MBCCHs.

8. The UE of claim 7, wherein the one or more processors are further configured to:
   receive an MB control information change notification associated with an MBCCH that is associated with a set of MB services to which the UE is not subscribed; and
   refrain from monitoring for updated MB control information based at least in part on receiving the MB control information change notification associated with the MBCCH that is associated with a set of MB services to which the UE is not subscribed.

9. The UE of claim 6, wherein at least two MBCCHs of the multiple MBCCHs are associated with a same MB-RNTI.

10. The UE of claim 9, wherein different MBCCHs, of the at least two MBCCHs that are associated with the same MB-RNTI, are associated with different non-overlapping scheduling windows, different hybrid automatic repeat request processes, different logical channel identifiers, or a combination thereof.

11. The UE of claim 6, wherein at least two MBCCHs of the multiple MBCCHs are associated with different MB-RNTIs.

12. The UE of claim 6, wherein at least two MBCCHs of the multiple MBCCHs correspond to different bandwidth part configurations.

13. The UE of claim 6, wherein the one or more processors are further configured to:
receive a configuration message that indicates respective sets of MB services corresponding to each of the multiple MBCCHs; and
monitor the MBCCH based at least in part on the configuration message.

14. The UE of claim 1, wherein the one or more processors are further configured to:
receive an indication of a new MB service; and
monitor the one or more resources of the MBCCH to receive the updated MB control information based at least in part on receiving the indication of the new MB service.

15. The UE of claim 1, wherein the PDCCH communication addressed to the MB-RNTI includes an indication of whether the PDCCH communication includes scheduling information for the MBCCH and not the notification of the change, includes the notification of the change and not the scheduling information, or includes both the scheduling information and the notification of the change.

16. The UE of claim 1, wherein the bitmap includes a bit to indicate a new MB service.

17. The UE of claim 1, wherein the one or more processors are further configured to:
receive an indication of one or more resources that carry the notification of the change to the MB control information; and
monitor the one or more resources that carry the notification of the change to the MB control information.

18. The UE of claim 1, wherein another notification of the change to the MB control information is received by the UE in a message addressed to a different RNTI than the MB-RNTI to which the PDCCH communication is addressed.

19. A method of wireless communication performed by a user equipment (UE), comprising:
receiving a physical downlink control channel (PDCCH) communication, addressed to a multicast broadcast (MB) radio network temporary identifier (MB-RNTI), that includes a notification of a change to MB control information associated with at least one MB service to which the UE is subscribed, the notification of the change including a bitmap, bits of the bitmap corresponding to one of respective MB control channels (MBCCHs) associated with respective MB services, or MB services associated with a single MBCCH; and
monitoring one or more resources of an MBCCH scheduled by the PDCCH to receive updated MB control information based at least in part on receiving the notification of the change to the MB control information.

20. The method of claim 19, wherein the MBCCH is the single MBCCH and is used to transmit MB control information for all MB services associated with a service area of the UE.

21. The method of claim 20, wherein the notification is triggered based at least in part on a change to any MB service associated with a service area of the UE.

22. The method of claim 20, wherein the single MBCCH is associated with multiple sets of MB services and a separate MB control information change notification is associated with each of the multiple sets of MB services.

23. The method of claim 22, further comprising:
receiving an MB control information change notification associated with an MB service to which the UE is not subscribed; and
refraining from monitoring for updated MB control information based at least in part on receiving the MB control information change notification associated with the MB service to which the UE is not subscribed.

24. The method of claim 19, wherein the MBCCH is one of multiple MBCCHs, each of the multiple MBCCHs being associated with a different set of MB services.

25. The method of claim 24, wherein a separate MB control information change is associated with each of the multiple MBCCHs.

26. The method of claim 25, further comprising:
receiving an MB control information change notification associated with an MBCCH that is associated with a set of MB services to which the UE is not subscribed; and
refraining from monitoring for updated MB control information based at least in part on receiving the MB control information change notification associated with the MBCCH that is associated with a set of MB services to which the UE is not subscribed.

27. The method of claim 19, further comprising:
receiving an indication of one or more resources that carry the notification of the change to the MB control information; and
monitoring the one or more resources that carry the notification of the change to the MB control information.

28. The method of claim 19, wherein another notification of the change to the MB control information is received by the UE in a message addressed to a different RNTI than the MB-RNTI to which the PDCCH communication is addressed.

29. A non-transitory computer-readable medium storing one or more instructions for wireless communication, the one or more instructions comprising:
one or more instructions that, when executed by one or more processors of a user equipment (UE), cause the one or more processors to:
receive a physical downlink control channel (PDCCH) communication, addressed to a multicast broadcast (MB) radio network temporary identifier (MB-RNTI), that includes a notification of a change to MB control information associated with at least one MB service to which the UE is subscribed, the notification of the change including a bitmap, bits of the bitmap corresponding to one of respective MB control channels (MBCCHs) associated with respective MB services, of MB services associated with a single MBCCH; and
monitor one or more resources of an MBCCH scheduled by the PDCCH to receive updated MB control information based at least in part on receiving the notification of the change to the MB control information.

30. An apparatus for wireless communication, comprising:
means for receiving a physical downlink control channel (PDCCH) communication, addressed to a multicast broadcast (MB) radio network temporary identifier (MB-RNTI), that includes a notification of a change to MB control information associated with at least one MB service to which the apparatus is subscribed, the notification of the change including a bitmap, bits of the bitmap corresponding to one of respective MB control channels (MBCCHs) associated with respective MB services, or MB services associated with a single MBCCH; and means for monitoring one or more resources of an MBCCH scheduled by the PDCCH to receive updated MB control information based at least in part on receiving the notification of the change to the MB control information.

\* \* \* \* \*